US012794651B2

(12) United States Patent
Wu et al.

(10) Patent No.: US 12,794,651 B2
(45) Date of Patent: Nov. 10, 2026

(54) METHOD AND APPARATUS FOR FREQUENCY BAND SWITCHING IN A WIRELESS COMMUNICATION SYSTEM

(71) Applicant: Samsung Electronics Co., Ltd., Suwon-si (KR)

(72) Inventors: Min Wu, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 18/577,440

(22) PCT Filed: Jul. 4, 2022

(86) PCT No.: PCT/KR2022/009581
§ 371 (c)(1),
(2) Date: Jan. 8, 2024

(87) PCT Pub. No.: WO2023/287088
PCT Pub. Date: Jan. 19, 2023

(65) Prior Publication Data

US 2024/0204969 A1 Jun. 20, 2024

(30) Foreign Application Priority Data

Jul. 16, 2021 (CN) ......................... 202110808849.1

(51) Int. Cl.
*H04W 72/0453* (2023.01)
*H04L 5/00* (2006.01)
(Continued)

(52) U.S. Cl.
CPC ....... *H04L 5/0092* (2013.01); *H04W 72/0453* (2013.01); *H04W 72/23* (2023.01); *H04W 76/28* (2018.02)

(58) Field of Classification Search
CPC ............ H04L 5/0092; H04W 72/0453; H04W 72/23; H04W 76/28; H04W 36/06;
(Continued)

(56) References Cited

U.S. PATENT DOCUMENTS 11,483,850 B2 * 10/2022 Li ......................... H04L 5/0057
11,647,462 B2 * 5/2023 Lin ................... H04W 52/0225 370/311

(Continued)

FOREIGN PATENT DOCUMENTS

WO 2018085145 A1 5/2018

OTHER PUBLICATIONS

International Search Report and Written Opinion of the International Searching Authority dated Oct. 13, 2022, in connection with International Application No. PCT/KR2022/009581, 8 pages.

*Primary Examiner* — Jay P Patel

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present disclosure provides method for frequency band switching performed by a user equipment and the user equipment. The method for frequency band switching performed by the user equipment includes: acquiring a configuration of one or more first frequency bands and one or more second frequency bands; performing switching between the first frequency band and the second frequency band.

15 Claims, 17 Drawing Sheets

(51) Int. Cl.
*H04W 72/23* (2023.01)
*H04W 76/28* (2018.01)

(58) Field of Classification Search
CPC ............. H04W 36/22; H04W 36/0055; H04W 52/0216; H04W 72/53; H04W 72/569; Y02D 30/70
See application file for complete search history.

(56) References Cited

U.S. PATENT DOCUMENTS

| | | | | |
|---|---|---|---|---|
| 11,825,317 | B2 * | 11/2023 | Zhou | H04B 7/0626 |
| 12,108,478 | B2 * | 10/2024 | Cirik | H04B 7/088 |
| 2018/0183551 | A1 | 6/2018 | Chou et al. | |
| 2018/0242319 | A1 | 8/2018 | Akkarakaran et al. | |
| 2019/0373667 | A1 | 12/2019 | Jeon et al. | |
| 2020/0229093 | A1 | 7/2020 | Ahmad et al. | |
| 2021/0037523 | A1 * | 2/2021 | Li | H04L 5/0091 |
| 2021/0127450 | A1 * | 4/2021 | Abdoli | H04W 52/0216 |
| 2022/0021432 | A1 * | 1/2022 | Zhou | H04W 24/10 |
| 2022/0077999 | A1 * | 3/2022 | Babaei | H04W 76/11 |
| 2022/0264688 | A1 * | 8/2022 | Cirik | H04B 7/088 |
| 2022/0279527 | A1 * | 9/2022 | Lee | H04W 72/56 |
| 2023/0031932 | A1 * | 2/2023 | Zheng | H04W 72/0453 |
| 2023/0164875 | A1 * | 5/2023 | Lee | H04W 76/23 370/329 |
| 2023/0217256 | A1 * | 7/2023 | Garcia-Saavedra | H04L 5/0087 370/329 |
| 2023/0276416 | A1 * | 8/2023 | Lai | H04W 72/0453 370/329 |
| 2024/0292328 | A1 * | 8/2024 | Chen | H04W 4/06 |

* cited by examiner

[Fig. 1]
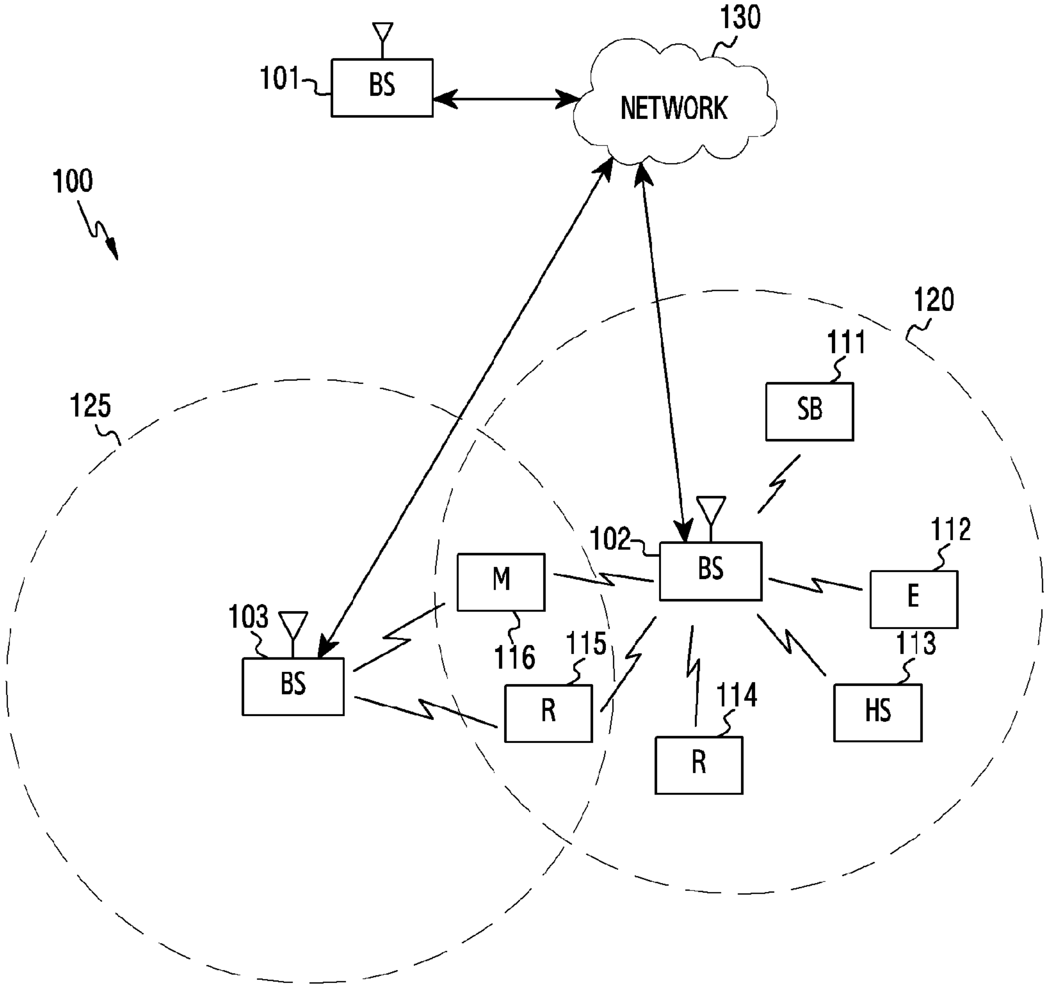

[Fig. 2A]
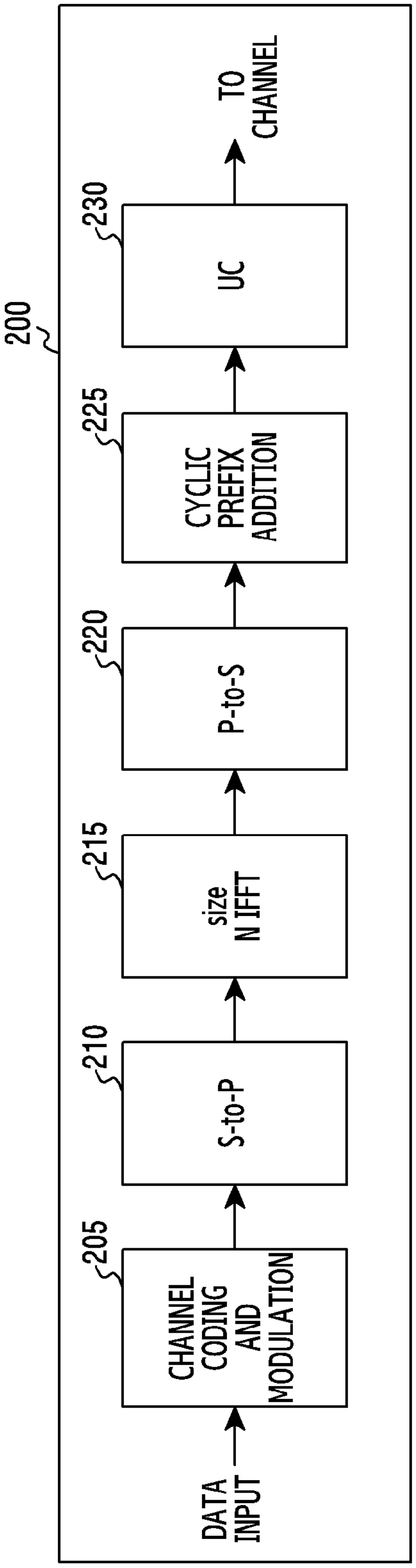

[Fig. 2B]
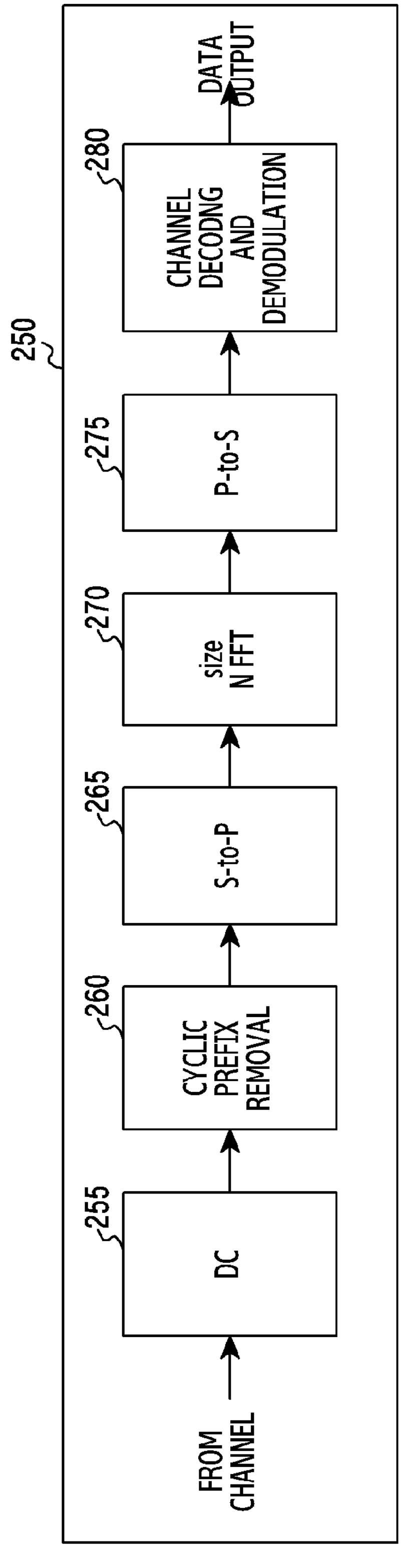

[Fig. 3A]
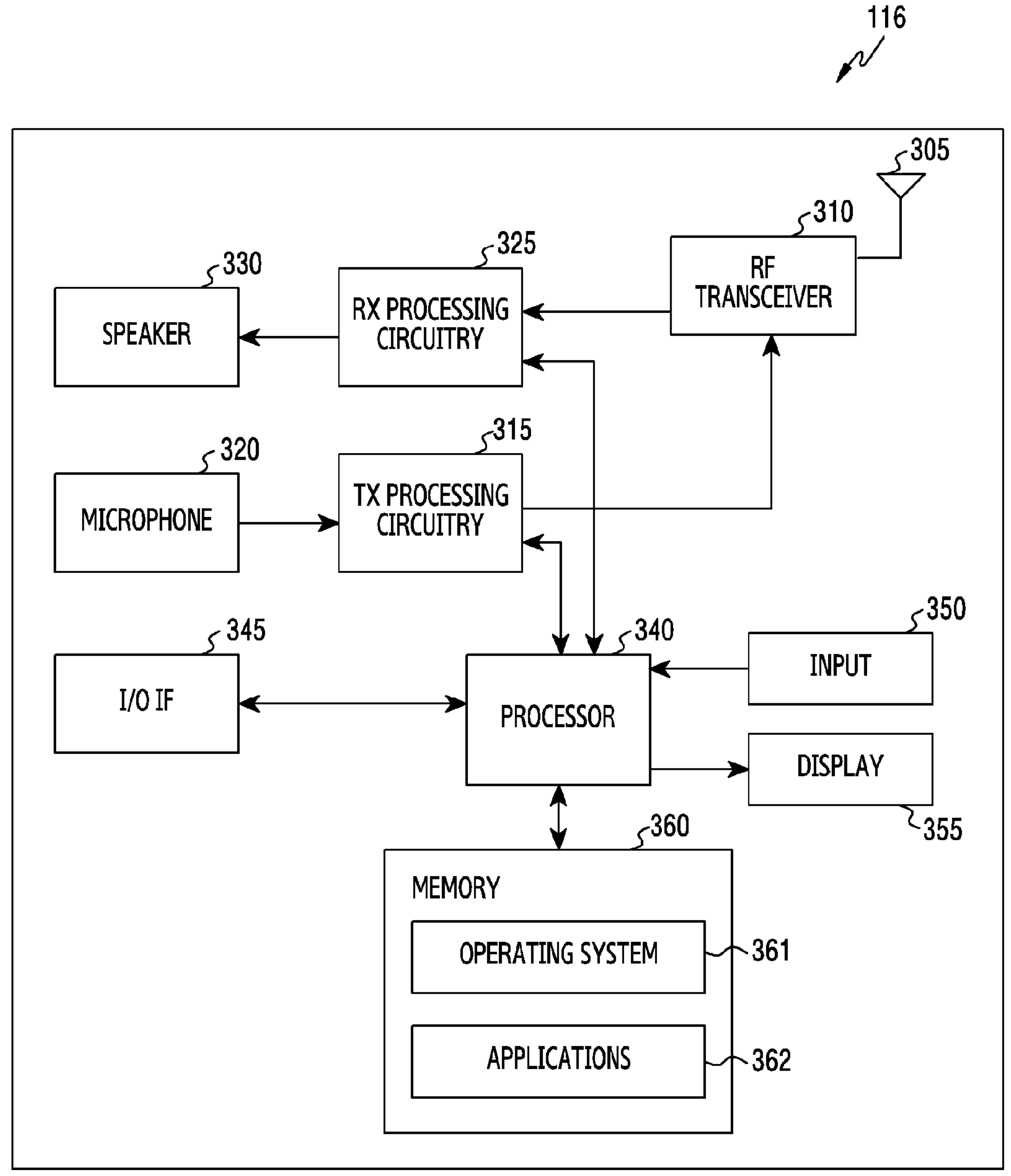

[Fig. 3B]
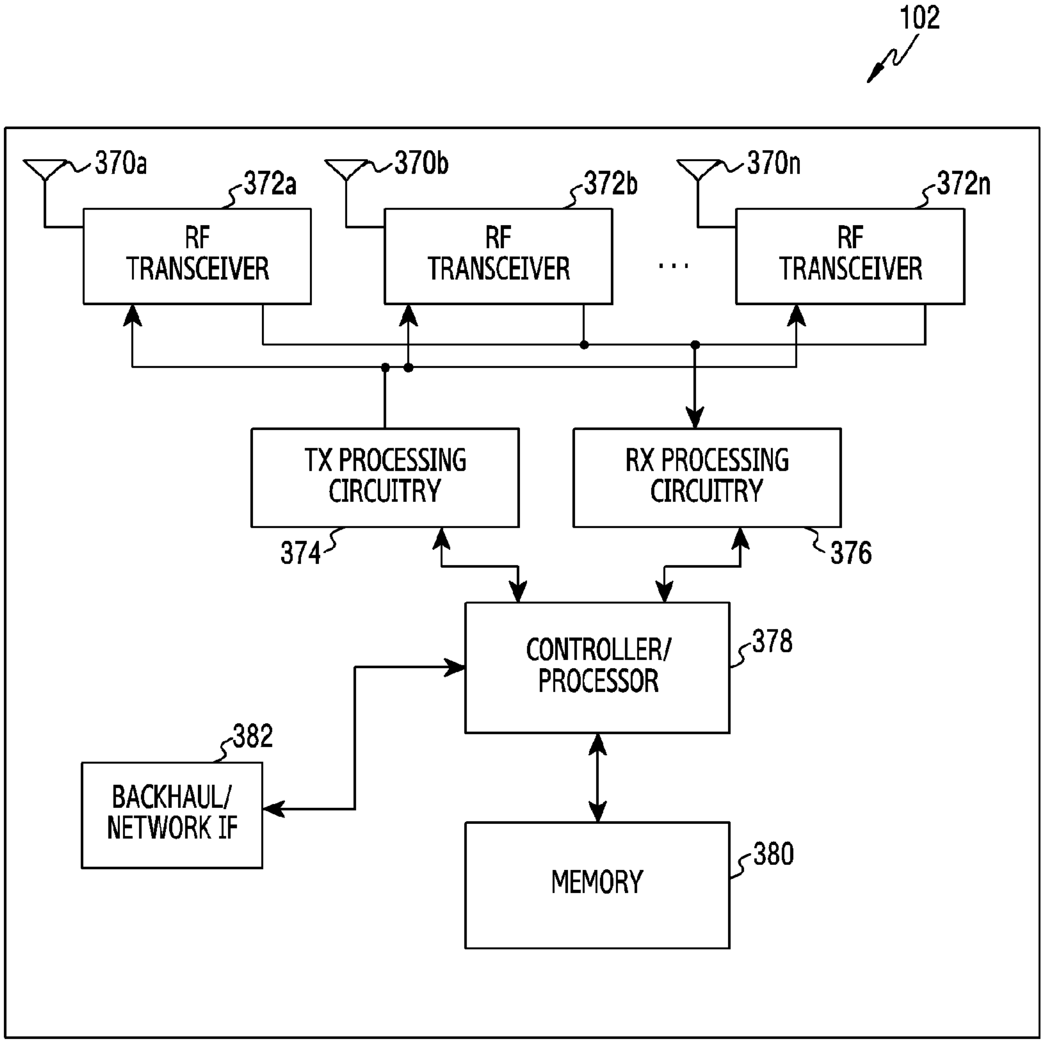
[Fig. 4]
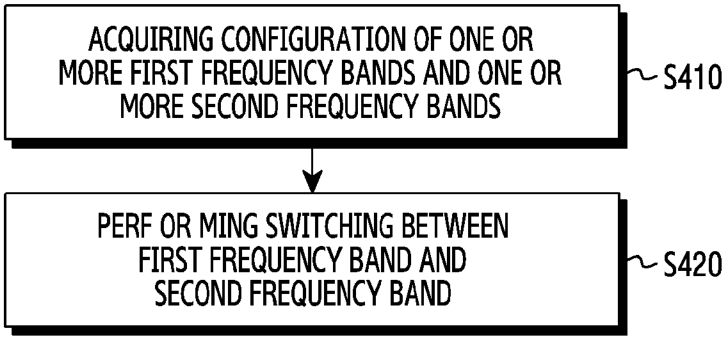

[Fig. 5]
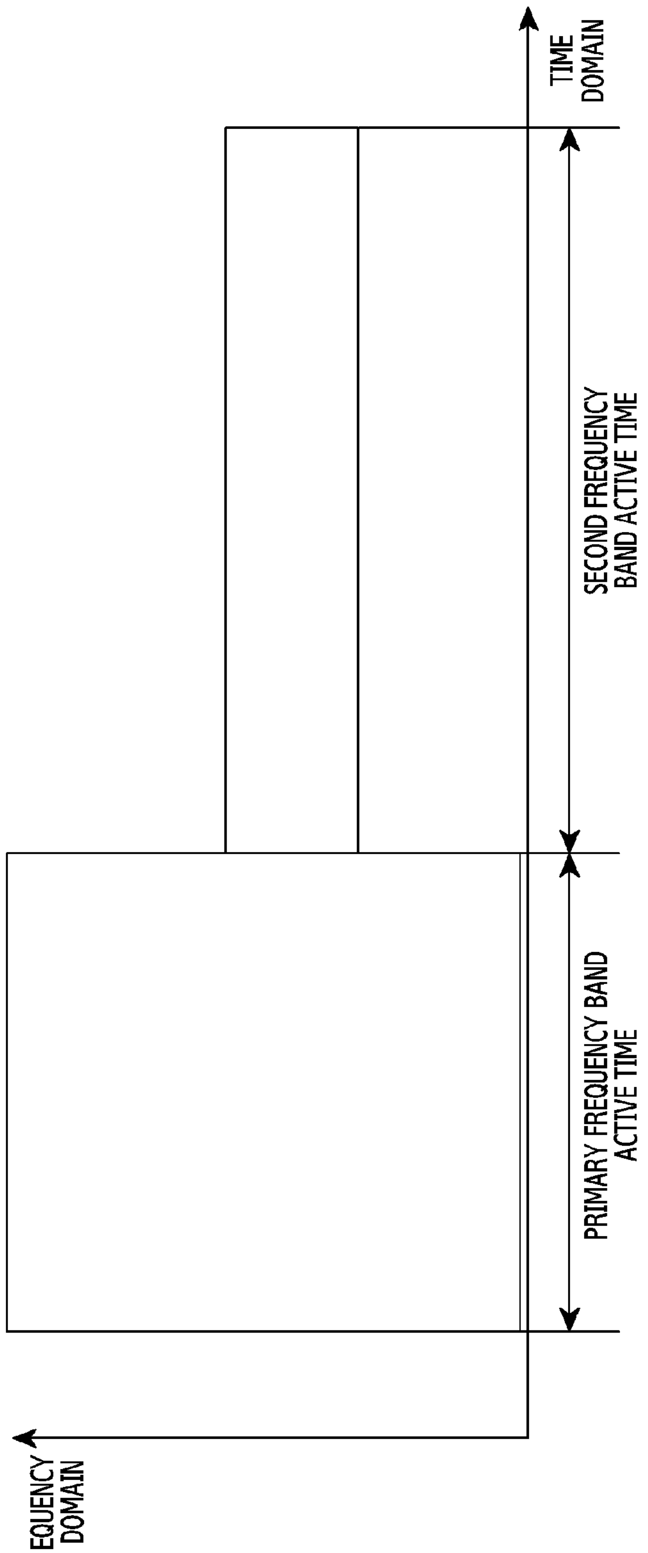

[Fig. 6]
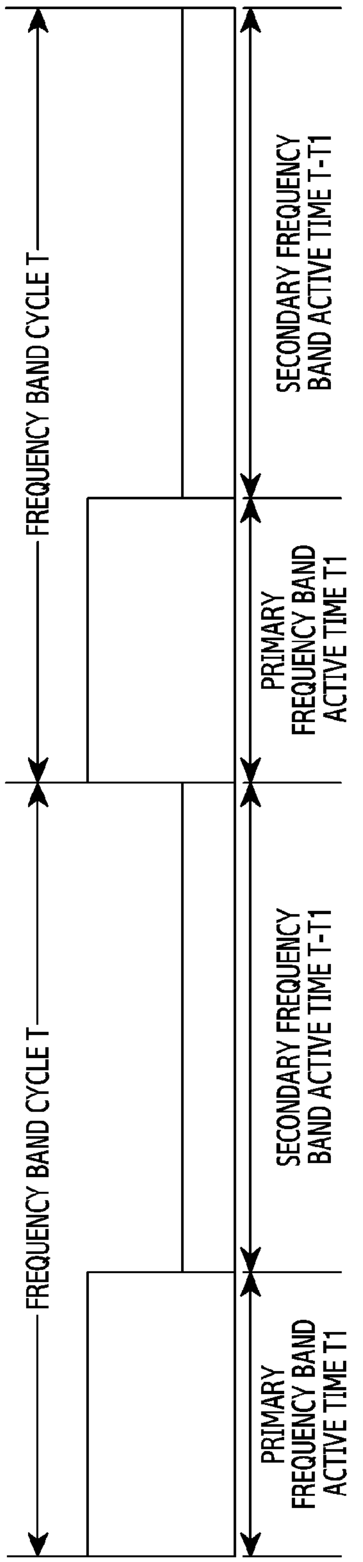

[Fig. 7]
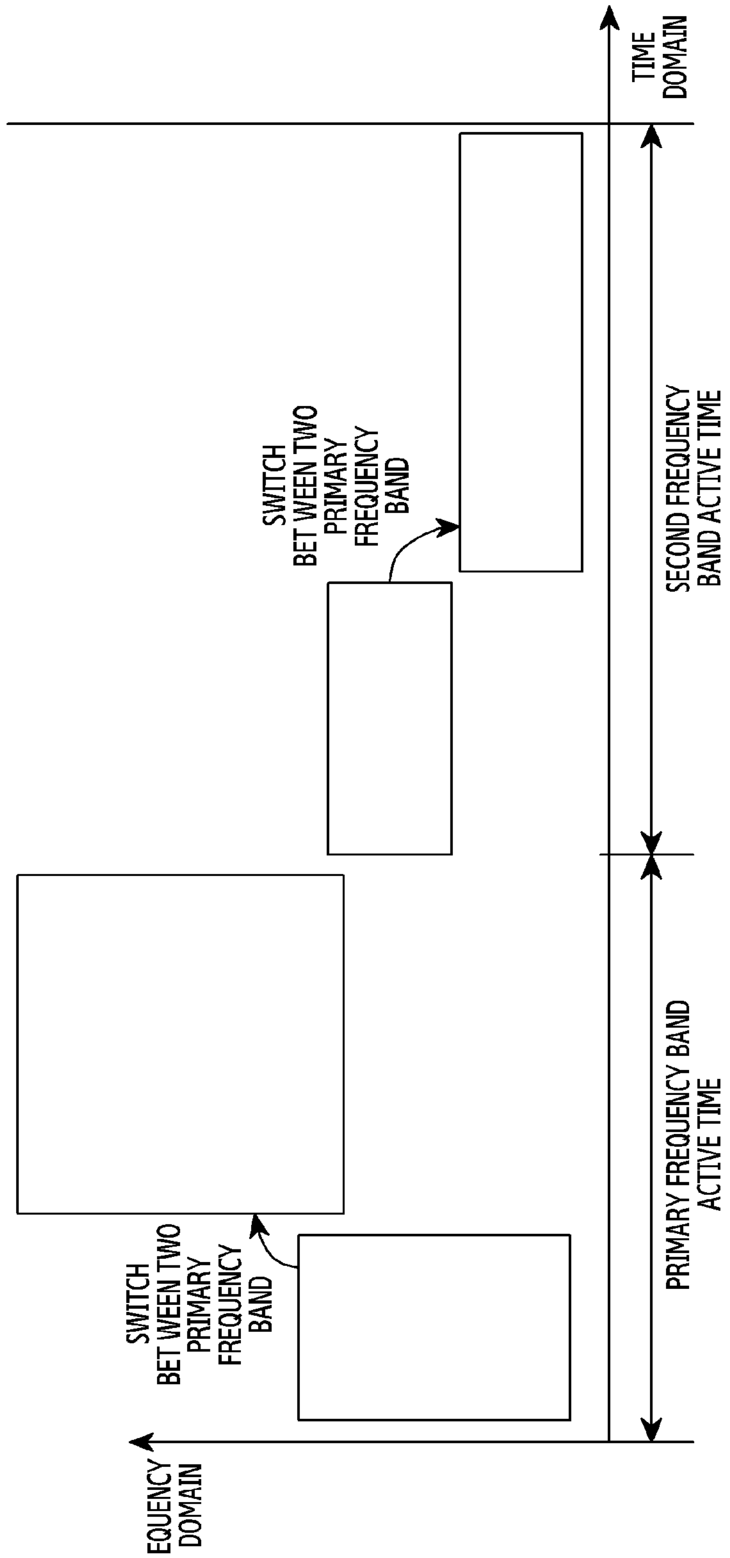

[Fig. 8]
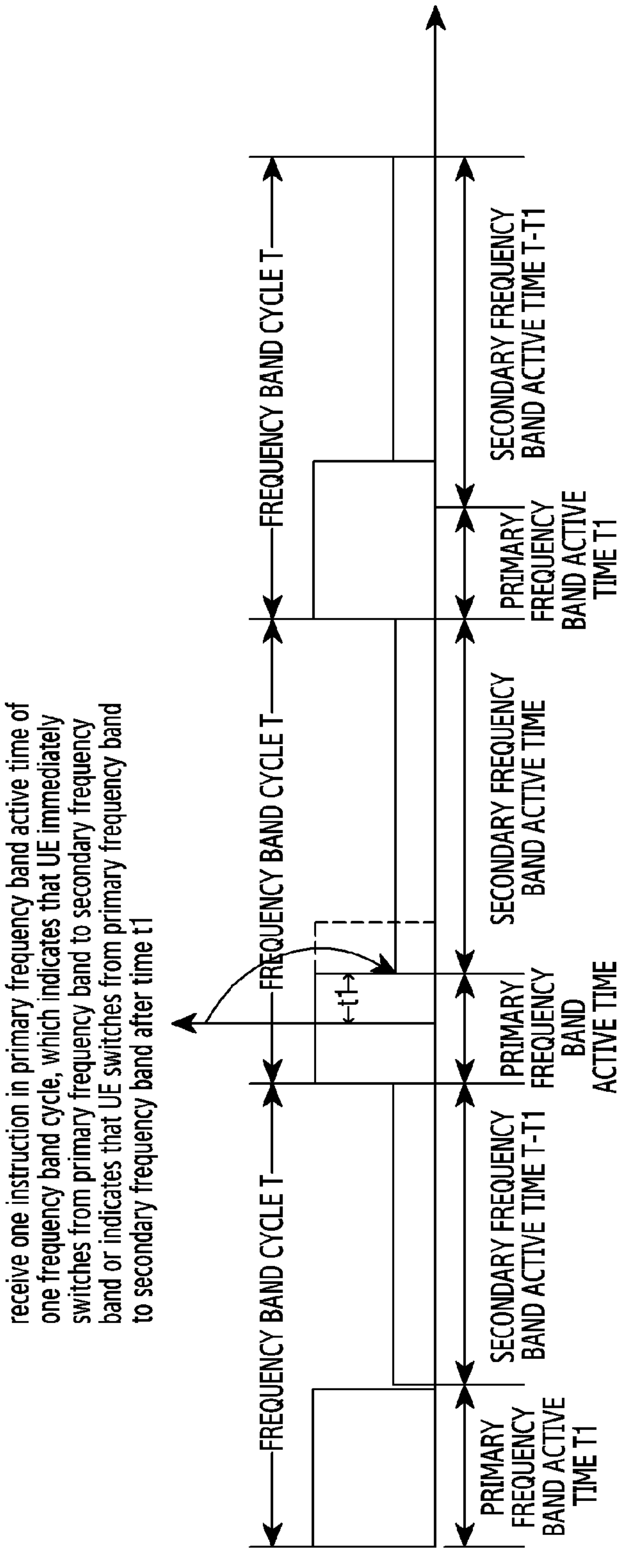

[Fig. 9]
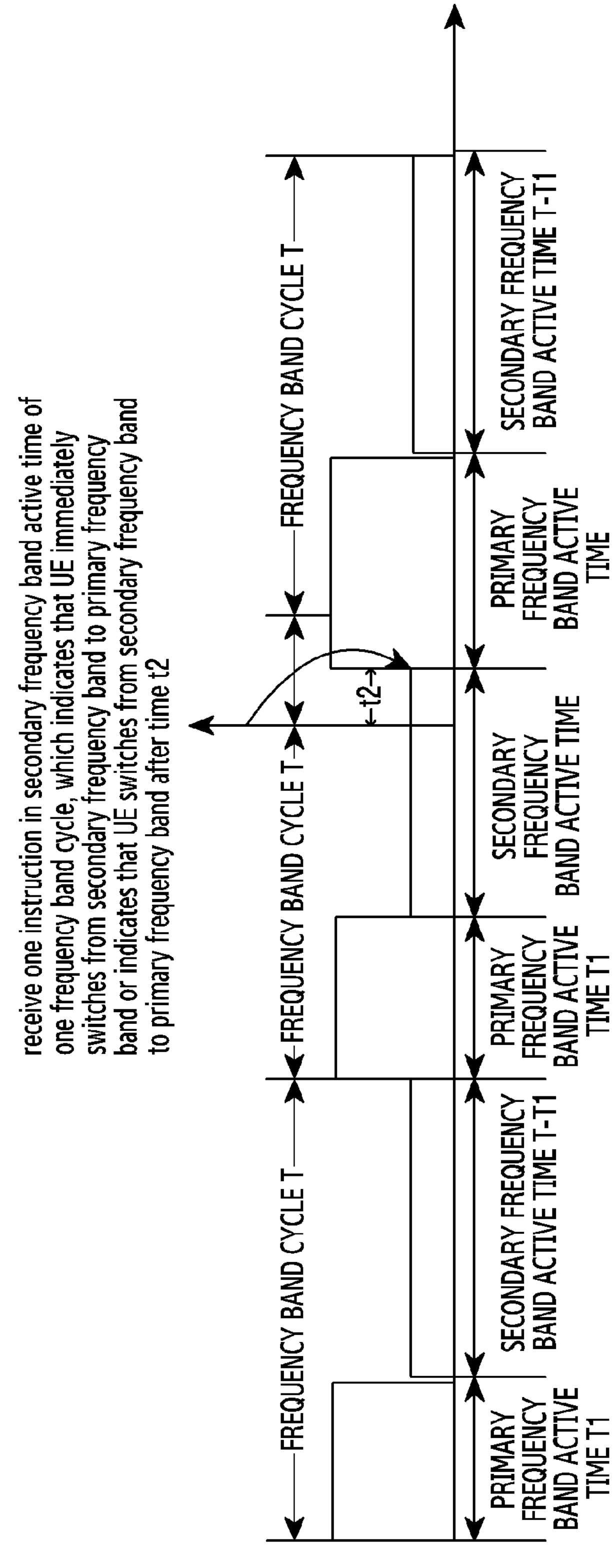

[Fig. 10]
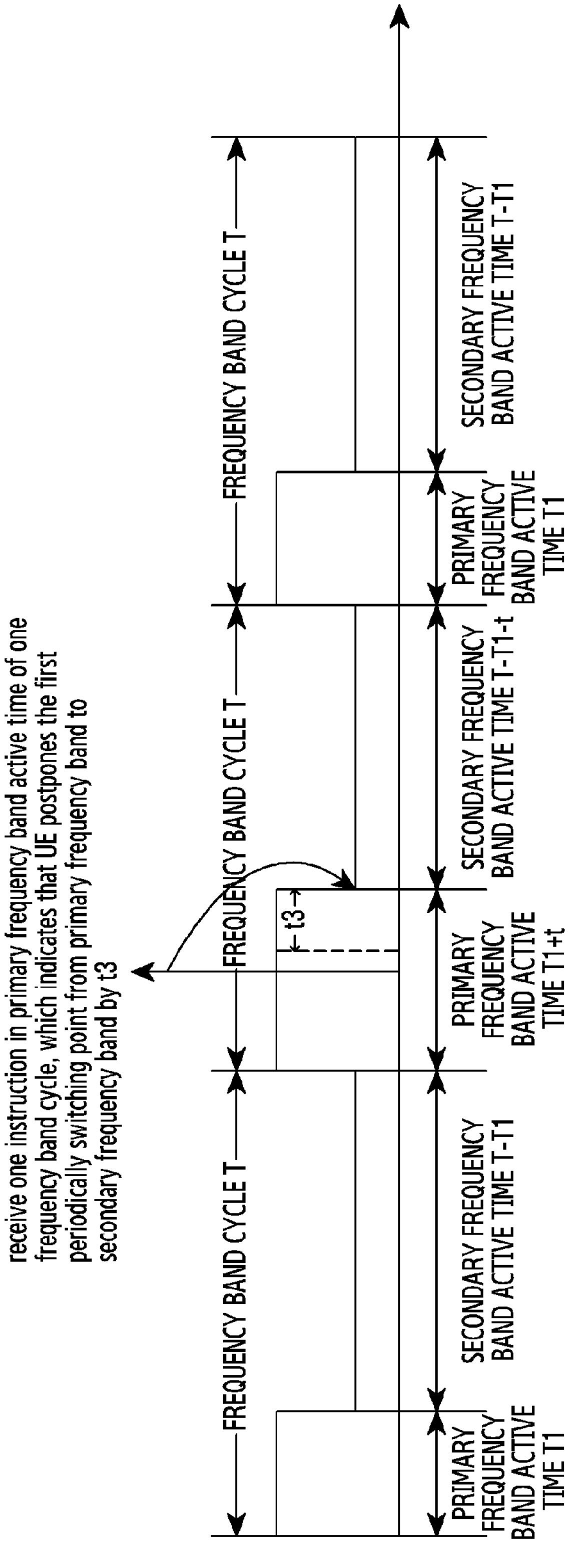

[Fig. 11]
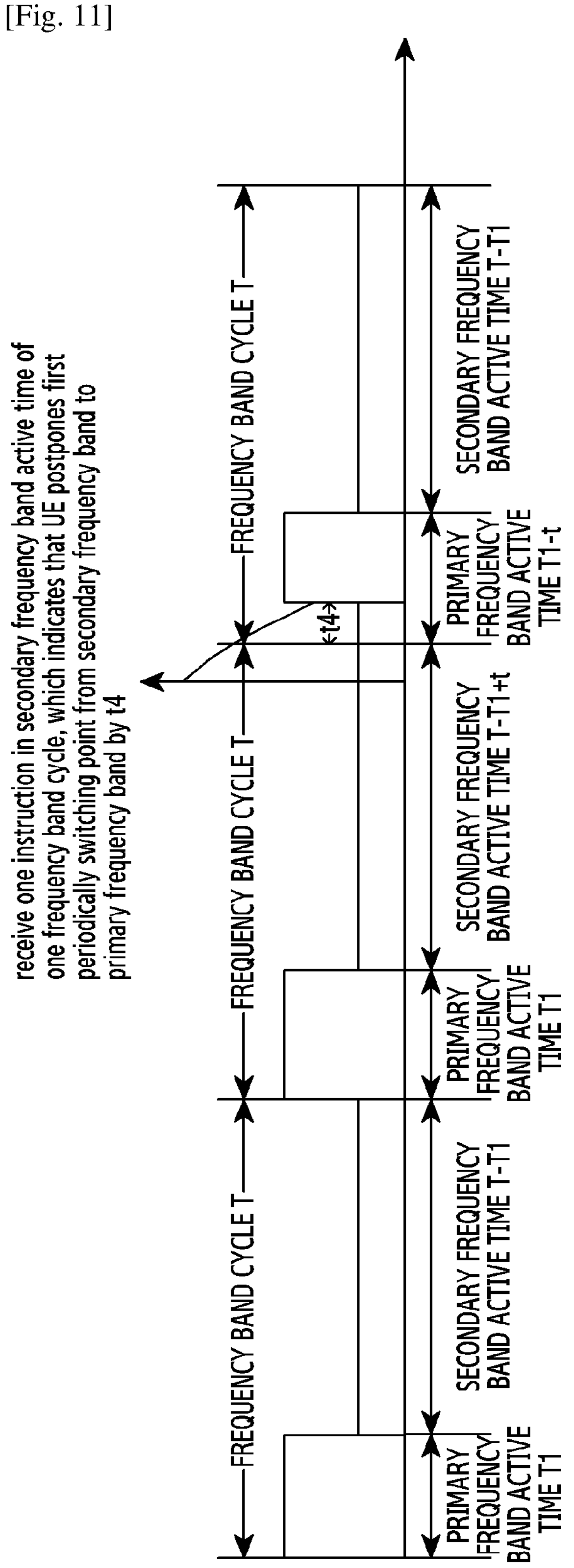

[Fig. 12]
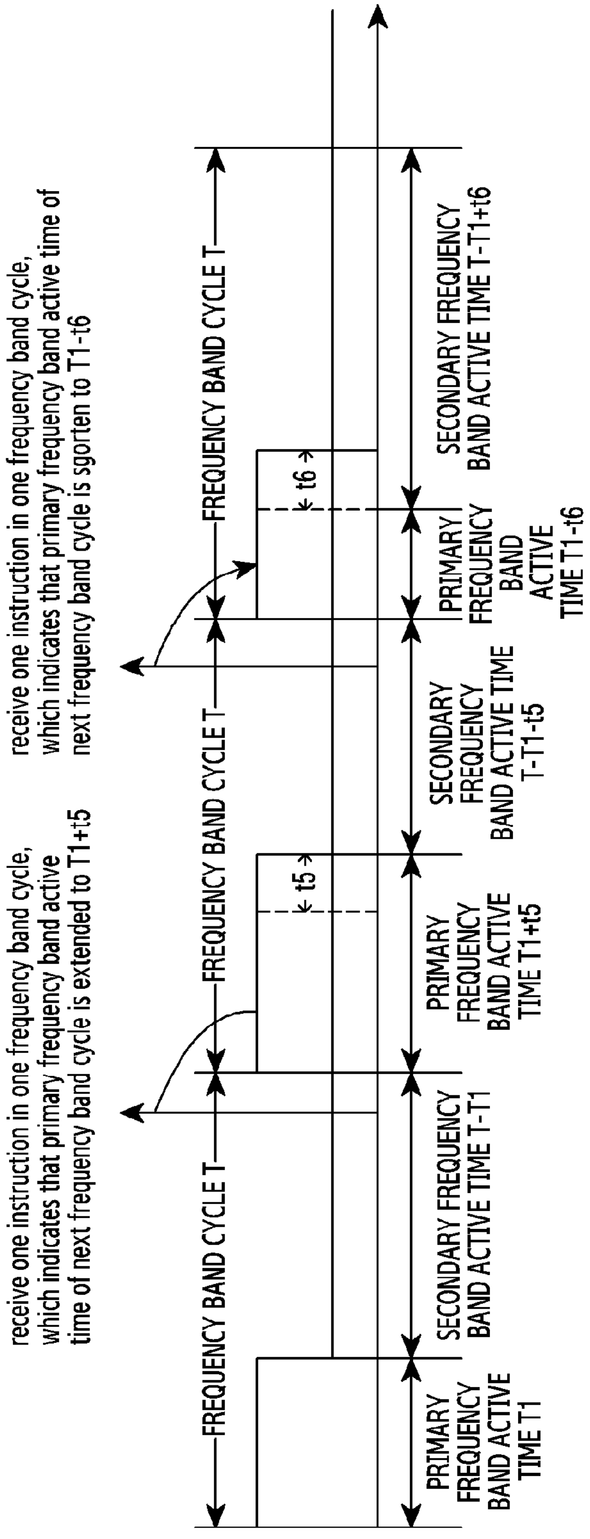

[Fig. 13]
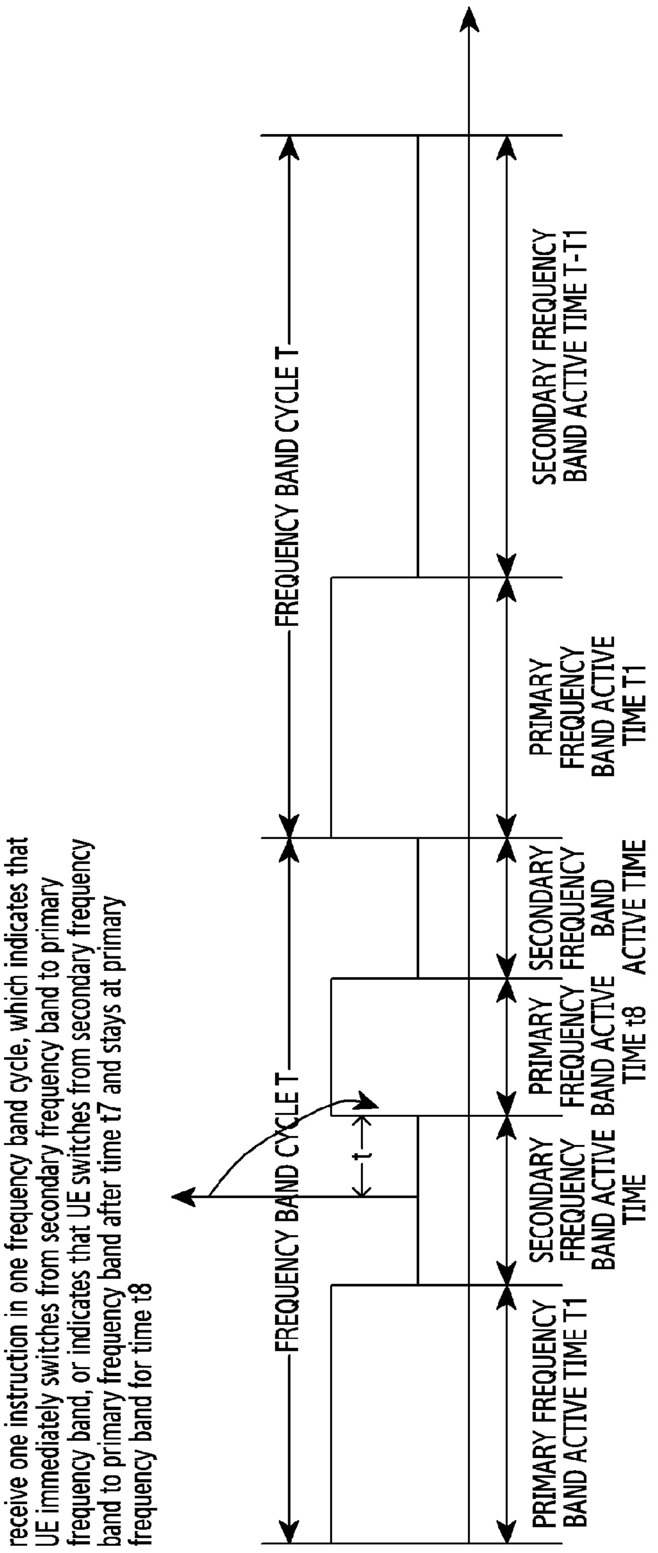

[Fig. 14]
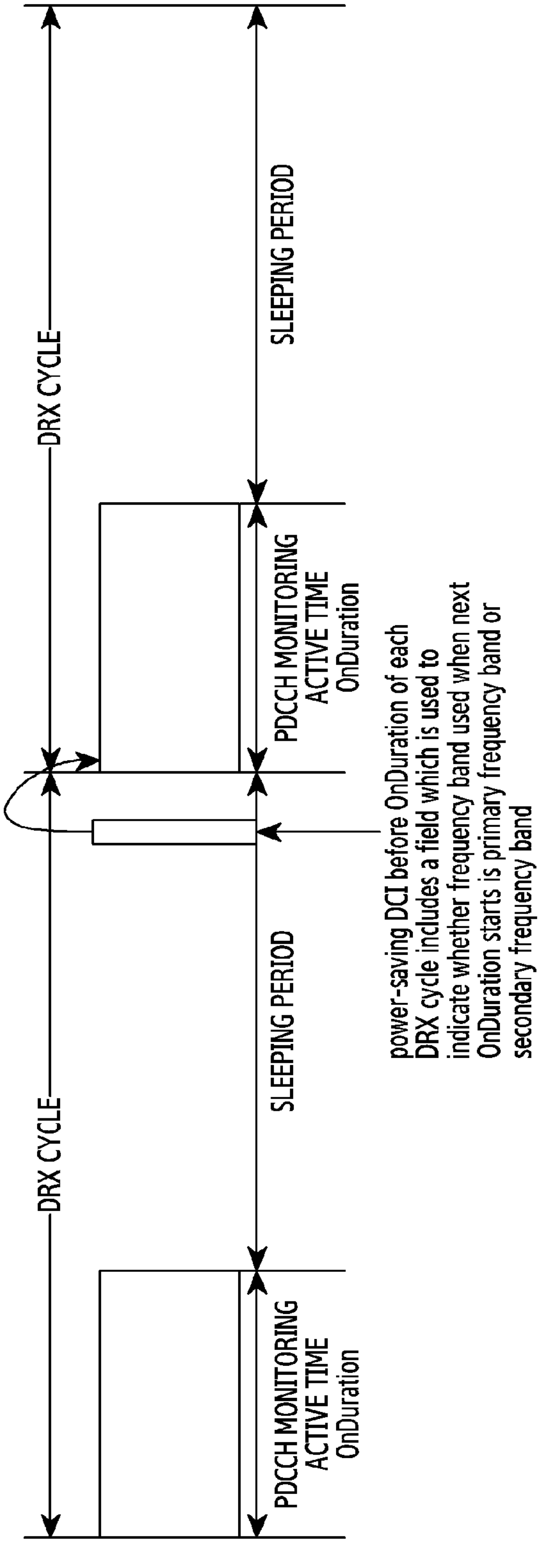

[Fig. 15]
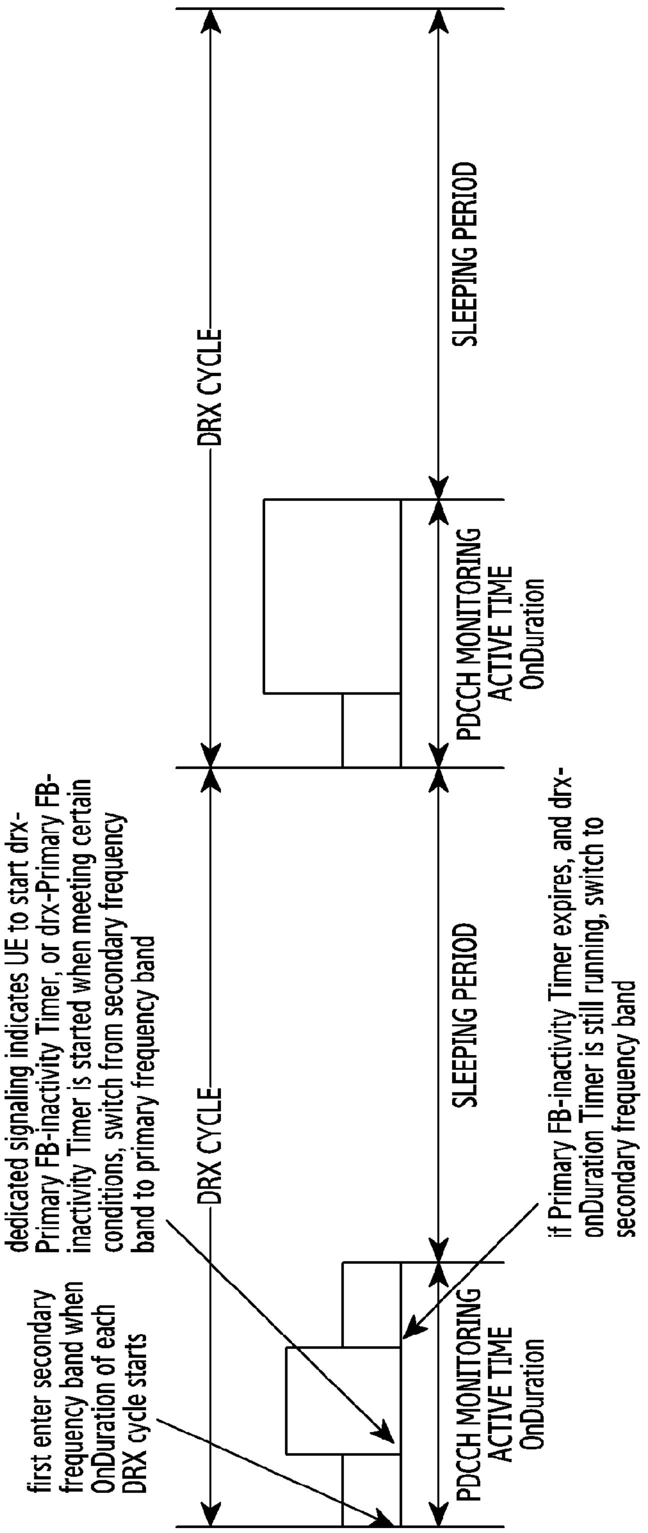

[Fig. 16]
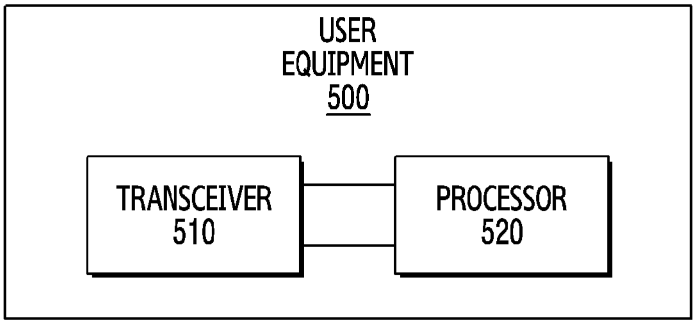

METHOD AND APPARATUS FOR FREQUENCY BAND SWITCHING IN A WIRELESS COMMUNICATION SYSTEM

TECHNICAL FIELD

The present application relates to the field of wireless communication technology, more specifically, to a method and user equipment for frequency band switching performed by user equipment.

BACKGROUND ART

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the 5G system, various communication schemes are discussed. For example, a grant-free communication scheme for transmitting data without granting an uplink transmission is proposed. Furthermore, various discussions for supporting the grant-free communication efficiently are underway.

DISCLOSURE OF INVENTION

Technical Problem

The present application relates to the field of wireless communication technology, more specifically, to a method and user equipment for frequency band switching performed by user equipment.

Solution to Problem

According to one aspect of the present disclosure, there is provided a method of frequency band switching performed by user equipment, which includes: acquiring a configuration of one or more first frequency bands and one or more second frequency bands; performing switching between the first frequency band and the second frequency band.

According to an aspect of the present disclosure, there is provided a user equipment, which includes a transceiver configured to transmit and receive signals with the outside; and a processor configured to control the transceiver to execute the method performed by the user equipment.

According to an aspect of the present disclosure, there is provided a non-transitory computer-readable recording medium on which a program for executing any of the above methods when being run by a computer has been stored.

Advantageous Effects of Invention

The present application relates to the field of wireless communication technology, more specifically, to a method and user equipment for frequency band switching performed by user equipment.

BRIEF DESCRIPTION OF DRAWINGS

FIG. 1 illustrates an example wireless network according to various embodiments of the present disclosure;

FIGS. 2A and 2B illustrate example wireless transmission and reception paths according to the present disclosure;

FIG. 3A shows an example user equipment UE according to the present disclosure;

FIG. 3B shows an example base station gNB 102 according to the present disclosure;

FIG. 4 shows a flowchart of a method of frequency band switching performed by a user equipment according to an embodiment of the present disclosure;

FIG. 5 is a schematic diagram showing that the primary frequency band and the secondary frequency band have the same central frequency point according to an embodiment of the present disclosure;

FIG. 6 shows a schematic diagram of a frequency band cycle according to an embodiment of the present disclosure;

FIG. 7 shows a schematic diagram of switching-related operations when user equipment is configured with a plurality of primary frequency bands and a plurality of secondary frequency bands according to an embodiment of the present disclosure;

FIG. 8 shows a schematic diagram of respective switching between the primary frequency band and the secondary frequency band based on a dedicated signaling according to an embodiment of the present disclosure;

FIG. 9 shows another schematic diagram of respective switching between the primary frequency band and the secondary frequency band based on a dedicated signaling according to an embodiment of the present disclosure;

FIG. 10 shows yet another schematic diagram of respective switching between the primary frequency band and the secondary frequency band based on a dedicated signaling according to an embodiment of the present disclosure;

FIG. 11 shows yet another schematic diagram of respective switching between the primary frequency band and the secondary frequency band based on a dedicated signaling according to an embodiment of the present disclosure;

FIG. 12 shows a schematic diagram of adjusting the primary frequency band active time of the next frequency band cycle based on a dedicated signaling according to an embodiment of the present disclosure;

FIG. 13 shows a schematic diagram of adjusting the primary frequency band active time of the current frequency band cycle based on a dedicated signaling according to an embodiment of the present disclosure;

FIG. 14 shows a schematic diagram of receiving a power-saving DCI in DRX cycle according to an embodiment of the present disclosure;

FIG. 15 shows a schematic diagram of frequency band switching in a DRX scenario according to an embodiment of the present disclosure; and FIG. 16 is a block diagram showing the structure of a user equipment 500 according to an embodiment of the present disclosure.

BEST MODE FOR CARRYING OUT THE INVENTION

The text and drawings are provided as examples only to help readers understand the disclosure. They are not intended and should not be interpreted as limiting the scope of the disclosure in any way. Although certain embodiments and examples have been provided, based on the content disclosed herein, it is obvious to those skilled in the art that modifications to the illustrated embodiments and examples can be made without departing from the scope of the disclosure.

Those skilled in the art will understand that the singular forms "a", "an", "said" and "the" used herein may include plural forms, unless otherwise specified. It should be further understood that the term "include/comprise" used in the specification of the disclosure refers to the existence of the described features, integers, steps, operations, elements and/or components, but does not exclude the existence or addition of one or more other features, integers, steps, operations, elements, components, and/or groups thereof. It should be understood that when an element is referred to as being "connected" or "coupled" to another element, it may be directly connected or coupled to the other element, or intervening elements may also be present. Furthermore, "connected" or "coupled" as used herein may include wirelessly connected or wirelessly coupled. As used herein, the term "and/or" includes all or any of the units and all combinations of one or more of the associated listed items.

Those skilled in the art will understand that, unless otherwise defined, all terms (including technical and scientific terms) used herein have the same meaning as generally understood by an ordinary person skilled in the art to which the disclosure belongs. It should be further understood that such terms as those defined in a generally used dictionary are to be interpreted to have the same contextual meanings as understood in the relevant field of art, and are not to be interpreted to have ideal or overly formal meanings unless clearly defined in the present specification.

Those skilled in the art will understand that "terminal" and "terminal device" used herein include both wireless signal receiver devices, which only have wireless signal receivers without transmission capability; and devices having receiver and transmitter hardware, which include receiver and transmitter hardware capable of performing bidirectional communication on a bidirectional communication link. Such devices may include: cellular or other communication devices with single-line or multi-line displays, or cellular or other communication devices without multi-line displays;

Personal Communications Service (PCS), which may combine voice, data processing, fax and/or data communication capabilities; Personal Digital Assistant (PDA), which may include radio frequency receivers, pagers, internet/intranet access, web browsers, notepads, calendars and/or Global Positioning System (GPS) receiver; conventional laptop and/or palmtop computer or other devices, which are conventional laptops and/or palmtop computers or other devices have and/or include a radio frequency receiver. "Terminal" and "terminal device" used herein may be portable, transportable, installed in transportation means (aircraft, ship, and/or vehicle), or suitable and/or configured for operation locally, and/or operated in a distributed manner on any other location on Earth and/or in space. "Terminal" and "terminal device" used herein may also be communication terminals, Internet terminals, music/video playback terminals, such as PDA, Mobile Internet Device (MID), and/or mobile phones with music/video playback function, and may also be smart TVs, set-top boxes and other devices.

Those skilled in the art can understand that the "base station" (BS) or "network device" used herein may refer to an eNB, an eNodeB, a NodeB, or a base station transceiver (BTS) or a gNB, etc. according to the technology and terminology used.

Those skilled in the art will understand that the "memory" used herein may be of any type suitable for the technical environment herein, and may be implemented using any suitable data storage technology, including but not limited to, semiconductor-based storage devices, magnetic storage devices and systems, optical storage devices and systems, fixed and removable storages.

Those skilled in the art will understand that the "processor" used herein may be of any type suitable for the technical environment herein, including but not limited to, one or more of the following: general purpose computers, special purpose computers, microprocessors, digital signal processors (DSPs), and multi-core-architectures based processors.

The time domain unit (also referred to as a time unit) in the disclosure may be: an OFDM symbol, a set of OFDM symbols (consisted of multiple OFDM symbols), a slot, a set of slots (consisted of multiple slots), a subframe, a set of subframes (consisted of multiple subframes), a system frame, a set of system frames (consisted of multiple system frames); it may also be an absolute time unit, such as 1 millisecond, 1 second, and the like. The time unit may also be a combination of multiple granularities, such as N1 slots plus N2 OFDM symbols.

The frequency domain unit in the disclosure may be: a subcarrier, a subcarrier group (consisted of multiple subcarriers), a resource block (RB), which may also be referred to as physical resource block (PRB), a resource block group (consisted of multiple RBs), a bandwidth part (BWP), a bandwidth part group (consisted of multiple BWPs), a band/carrier, and a band group/carrier group; it may also be absolute frequency domain units, such as 1 Hz, 1 kHz, and the like. The frequency domain unit may also be a combination of multiple granularities, such as M1 PRBs plus M2 subcarriers.

Hereinafter, embodiments according to the disclosure will be described in detail with reference to the accompanying drawings.

The following description with reference to the accompanying drawings is provided to facilitate a comprehensive understanding of various embodiments of the present disclosure as defined by the claims and their equivalents. This description includes various specific details to facilitate understanding, but should only be considered exemplary. Therefore, those of ordinary skill in the art will recognize that various changes and modifications can be made to the various embodiments described herein without departing from the scope and spirit of the present disclosure. In addition, for the sake of clarity and conciseness, the description of well-known functions and structures can be omitted.

The terms and expressions used in the following description and claims are not limited to their dictionary meaning, but are only used by the inventor to enable a clear and consistent understanding of the present disclosure. Therefore, it should be apparent to those skilled in the art that the following description of various embodiments of the present disclosure is provided for the purpose of illustration only and not to limit the purpose of the present disclosure as defined in the appended claims and their equivalents.

It should be understood that the singular forms of "one", "one" and "this" include plural references unless the context clearly indicates otherwise. Thus, for example, a reference to a "component surface" includes a reference to one or more such surfaces.

The terms "include" or "may include" refer to the existence of corresponding disclosed functions, operations or components that may be used in various embodiments of the present disclosure, rather than limiting the existence of one or more additional functions, operations or features. In addition, the terms "include" or "have" may be interpreted to mean certain characteristics, numbers, steps, operations, constituent elements, components or combinations thereof, but shall not be interpreted to exclude the possibility of the existence of one or more other characteristics, numbers, steps, operations, constituent elements, components or combinations thereof.

The term "or" used in various embodiments of the present disclosure includes any of the listed terms and all combinations thereof. For example, "A or B" may include A, may include B, or may include both A and B.

Unless otherwise defined, all terms (including technical terms or scientific terms) used in the present disclosure have the same meaning as understood by those skilled in the art described in the present disclosure. Common terms as defined in dictionaries are interpreted as having meanings consistent with the context in the relevant technical field, and should not be interpreted idealized or overly formalized unless explicitly so defined in the present disclosure.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

The gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

FIGS. 2A and 2B illustrate example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

FIG. 3A illustrates an example UE 116 according to the present disclosure. The embodiment of UE 116 shown in FIG. 3A is for illustration only, and UEs 111-115 of FIG. 1 can have the same or similar configuration. However, a UE has various configurations, and FIG. 3A does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

FIG. 3B illustrates an example gNB 102 according to the present disclosure. The embodiment of gNB 102 shown in FIG. 3B is for illustration only, and other gNBs of FIG. 1 can have the same or similar configuration. However, a gNB has various configurations, and FIG. 3B does not limit the scope of the present disclosure to any specific implementation of a gNB. It should be noted that gNB 101 and gNB 103 can include the same or similar structures as gNB 102.

As shown in FIG. 3B, gNB 102 includes a plurality of antennas 370*a*-370*n*, a plurality of RF transceivers 372*a*-372*n*, a transmission (TX) processing circuit 374, and a reception (RX) processing circuit 376. In certain embodiments, one or more of the plurality of antennas 370*a*-370*n* include a 2D antenna array. The gNB 102 also includes a controller/processor 378, a memory 380, and a backhaul or network interface 382.

RF transceivers 372*a*-372*n* receive an incoming RF signal from antennas 370*a*-370*n*, such as a signal transmitted by UEs or other gNBs. RF transceivers 372*a*-372*n* down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372*a*-372*n* receive the outgoing processed baseband or IF signal from TX processing circuit 374 and upconvert the baseband or IF signal into an RF signal transmitted via antennas 370*a*-370*n*.

The controller/processor 378 can include one or more processors or other processing devices that control the overall operation of gNB 102. For example, the controller/processor 378 can control the reception of forward channel signals and the transmission of backward channel signals through the RF transceivers 372*a*-372*n*, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372*a*-372*n*, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

The exemplary embodiments of the present disclosure are further described below in conjunction with the accompanying drawings.

The text and drawings are provided as examples only to help readers understand the present disclosure. They are not intended and should not be interpreted as limiting the scope of the present disclosure in any way. Although certain embodiments and examples have been provided, based on the content disclosed herein, it is clear to those skilled in the art that modifications to the illustrated embodiments and examples can be made without departing from the scope of the present disclosure.

In the current new radio (NR) system, the system bandwidth can be very large, and the user equipment (UE) does not need to support all the bandwidth compulsorily, but only needs to support part of the bandwidth, which can greatly save the power consumption of UE. Therefore, the concept of Bandwidth Part (BWP) is proposed and supported. Through BWP switching, UE can achieve flexible scheduling, including bandwidth size and frequency band location, to adapt to different business requirements and overcome frequency selective fading and so on. Except for the inconsistency of bandwidth size and frequency band position, the configuration parameters of other physical layer channel/signal are independently configured by each BWP.

In addition to the initial BWP used when initially accessing the cell, the UE in the RRC connection state can further be configured with up to four BWPs, and the UE can only work on one BWP thereof at one time, that is, the UE can switching among up to five BWPs, and there are three ways of BWP switching: RRC signaling-based BWP switching, DCI signaling-based BWP switching and timer-based BWP switching.

The following describes three ways of BWP switching in detail.

(1) RRC Signaling-Based BWP Switching

RRC signaling-based BWP switching is mainly used to let UE enter a new BWP after RRC reconfiguration message is issued or a secondary cell SCell is activated. The first active downlink BWP identifier (firstActiveDownlinkBWP-Id) in the serving cell configuration (ServingCellConfig) and the first active uplink BWP identifier (firstActiveUplinkBWP-Id) in the uplink configuration (UplinkConfig) are used to respectively indicate the downlink BWP and uplink BWP that the UE enters after the RRC reconfiguration message is issued or after the SCell is activated. RRC signaling-based BWP switching can enable UE to enter the appropriate BWP to send and receive data immediately after RRC reconfiguration message is issued or the SCell is activated, instead of staying on the initial BWP.

(2) Timer-Based BWP Switching

If the UE does not need to send and receive data for a long time, it means that the UE may not need to send and receive data at the moment. In order to save energy, it is best to let the UE return to a BWP with smaller bandwidth to save energy. This is also the purpose of introducing timer-based BWP switching. The BWP inactivity timer (bwp-InactivityTimer) is used to time how long the UE has not sent or received data, and the default downlink BWP identifier (defaultDownlinkBWP-Id) defines the BWP that the UE will enter after the bwp-Inactivity Timer expires. The bwp-Inactivity Timer determines whether the UE has data or not according to whether the UE has received the scheduling DCI, if the UE does not receive the uplink and downlink scheduling DCI within the time of the bwp-Inactivity Timer, the UE enters the default-DownlinkBWP-Id. The current system only defines the defaultDownlinkBWP-Id, but there is no default uplink BWP identifier (defaultUplinkBWP-Id), that is, if the bwp-Inactivity Timer expires, only the downlink BWP needs to be switched, and the uplink BWP does not need to be switched. Mainly because the downlink BWP consumes more power and the bandwidth of the downlink BWP is generally large, it is necessary to switch the downlink BWP to defaultDownlinkBWP.

(3) DCI-Based BWP Switching

DCI-based BWP switching is the most flexible among the three BWP switching modes. As long as there is scheduling DCI, the base station can initiate BWP switching for UE. There is a BWP index field in DCI 1-1 to indicate the target downlink BWP of switching, and there is also a BWP index field in DCI 0-1 to indicate the target uplink BWP of switching. In NR, DCI 1-1 and DCI 0-1 are used to schedule data, and can also indicate BWP to switch. The protocol does not support that DCI is only used to indicate BWP to switch but not used to schedule data. When UE performs DCI-based BWP switching, the data scheduled by DCI is on the new BWP, but the size of DCI is determined according to the old BWP, which will involve the problem of inconsistent DCI size. For example, if the FDRA field is 10 bits on the old BWP while the new BWP only needs 8 bits, just intercept the lower 8 bits of these 10 bits for the new BWP to interpret and use. If the FDRA field is 8 bits on the old BWP while the new BWP needs 10 bits, then add 2 zeros to the 8 bits for the new BWP to interpret and use.

Although BWP switching has been able to flexibly schedule UE, BWP switching may include not only the switching of frequency band size, but also the switching of central frequency point and the switching of a series of configuration parameters of physical layer channel/signal. Therefore, the current BWP switching needs a large switching time. However, the most important factor affecting the power consumption of UE is the size of bandwidth, therefore, UE can only switch the bandwidth size without switching the central frequency point and configuration parameters of the physical layer channel/signal, and such change of bandwidth size can be further realized under the BWP concept to simplify UE behavior. Therefore, the definitions of primary frequency band and secondary frequency band, and the switching mechanism between the primary/secondary frequency bands are put forward herein.

Next, we will continue to introduce in detail the implementation of the method of frequency band switching performed by user equipment provided by the embodiment of the present disclosure with reference to the attached drawings.

Please refer to FIG. 4, which shows a flow chart of a method of frequency band switching performed by user equipment according to an embodiment of the present disclosure. The method may include step S410 and step S420.

Step S410, acquiring a configuration of one or more first frequency bands and one or more second frequency bands.

The first frequency band can be a primary frequency band and the second frequency band can be a secondary frequency band, wherein the bandwidth of the primary frequency band is larger than that of the secondary frequency band.

For example, one or more primary frequency bands and one or more secondary frequency bands can be preconfigured through a higher layer signaling.

Step S420, performing switching between the primary frequency band and the secondary frequency band.

By performing switching-related operations between the primary frequency band and the secondary frequency band, the user equipment does not need to switch the central frequency point and the configuration parameters of the physical layer channel/signal, which simplifies the behavior of the user equipment and saves the power consumption of the user equipment.

Next, the definitions of the primary frequency band and the secondary frequency band herein and the relationship between them are introduced in detail with the attached drawings.

Herein, in order to further reduce the power consumption of RRC-connected UE, the working frequency band is divided into a primary frequency band and a secondary frequency band. The primary frequency band has a larger bandwidth, which is mainly used for traffic with a large amount of data, while the secondary frequency band has a smaller bandwidth, which is mainly used for traffic with a small amount of data and a basic support of network connection. The power consumption of the UE on the secondary frequency band can be much less than that on the primary frequency band, and the UE needs to switch between the primary frequency band and the secondary frequency band according to the traffic change.

In an alternative implementation, the ratio of the bandwidth of the primary frequency band to the bandwidth of the secondary frequency band mentioned above needs to be greater than the preset value, that is, the ratio of the bandwidths of the primary frequency band and the secondary frequency band needs to be greater than the preset ratio value.

In an alternative implementation, the primary frequency band and the secondary frequency band can be two discontinuous frequency bands, that is, there can be no overlap between the primary frequency band and the secondary frequency band.

In an alternative implementation, the above-mentioned primary frequency band and secondary frequency band can be two independently configured bandwidth parts BWP, the BWP with large bandwidth is set as the primary frequency band and the BWP with small bandwidth is set as the secondary frequency band, and the switching between the primary frequency band and the secondary frequency band is the switching between two BWPs, only the triggering mode of the switching may be different from that of the existing system.

In an alternative implementation, the above-mentioned primary frequency band and secondary frequency band can be the same bandwidth part BWP.

In an alternative implementation, the primary frequency band and the secondary frequency band have the same central frequency point. Here, the primary frequency band and the secondary frequency band can belong to the same BWP, and for a part of physical channel/signal, the primary frequency band and the secondary frequency band can share the same configuration parameters, for example, the physical control channel for transmitting control information; for another part of physical channel/signal, different configuration parameters can be used for the primary frequency band and the secondary frequency band, for example, the physical shared channel for transmitting data.

Please refer to FIG. 5, which shows a schematic diagram that the primary frequency band and the secondary frequency band have the same central frequency point according to an embodiment of the present disclosure.

As shown in FIG. 5 below, the primary frequency band and the secondary frequency band have the same central frequency point. The advantage that the primary frequency band and the secondary frequency band have the same center frequency point is that the switching time between the primary frequency band and the secondary frequency band can be saved. Sharing the same configuration parameters between the primary frequency band and the secondary frequency band can also save the switching time between the primary frequency band and the secondary frequency band.

In an alternative implementation, the above definitions of primary frequency band and secondary frequency band can be applied to both downlink frequency band and uplink frequency band, that is, including downlink primary frequency band, downlink secondary frequency band, uplink primary frequency band and uplink secondary frequency band.

In another alternative implementation, the above definitions of the primary frequency band and the secondary frequency band are only for the downlink frequency band, because the bandwidth of the downlink frequency band has a great influence on the UE power consumption, while the bandwidth of the uplink frequency band has a little influence on the UE power consumption.

The following is a detailed description of the switching-related operations between the primary frequency band and the secondary frequency band.

In an alternative implementation, the UE may switch from the primary frequency band to the secondary frequency band and/or from the secondary frequency band to the primary frequency band based on the received dedicated signaling, for example, the first signaling, wherein the first signaling is carried by the media access control control element MAC CE or the downlink control information DCI.

In an alternative implementation, in order to support the flexible change of the UE traffic, the base station can control the UE to switch between the primary frequency band and the secondary frequency band through a timer, that is, without signaling triggering, the UE can switch between the primary frequency band and the secondary frequency band autonomously, according to the start or expiration of the timer, and the timer can be started or restarted under specific conditions.

For example, when the frequency band back-off timer expires, the switch from the primary frequency band to the secondary frequency band is executed, wherein the frequency band back-off timer is preconfigured by high-level signaling, and the frequency band back-off timer is started or restarted when at least one of the following conditions is met:

(1) receiving, on the primary frequency band, a physical downlink control channel PDCCH for scheduling new data transmission;

(2) receiving, on the primary frequency band, a PDCCH for scheduling new data transmission and scrambled using a specific radio network temporary identifier RNTI value, the specific RNTI value corresponds to traffic with a large amount of data;

(3) receiving, on the primary frequency band, a PDCCH for scheduling new data transmission and in a specific PDCCH search space, the specific PDCCH search space corresponds to traffic with a large amount of data;

(4) receiving, on the primary frequency band, a PDCCH for scheduling new data transmission and in a specific control resource set CORESET, the specific CORESET corresponds to traffic with a large amount of data;

(5) receiving, on the primary frequency band, a PDCCH for scheduling new data transmission and using a specific downlink control information DCI format, the specific DCI format corresponds to traffic with a large amount of data;

(6) receiving, on the primary frequency band, a PDCCH for scheduling new data transmission and with a scheduled transport block size TBS value exceeding the preset threshold;

(7) receiving, on the primary frequency band, a PDCCH for scheduling new data transmission and with the number of allocated frequency domain resource blocks exceeding the preset threshold; or (8) receiving, on the primary frequency band, a PDCCH for scheduling new data transmission and with the carried downlink control information DCI containing an indication domain that explicitly or implicitly indicates that a traffic type is traffic with a large amount of data.

The advantage of this implementation is to reduce the UE power consumption as much as possible, and at the same time reduce the signaling overhead. On the basis of this implementation, in order to better match the dynamic changes of traffics, it is also possible to dynamically instruct the UE to start or restart the timer through a dedicated signaling, or to dynamically adjust the timer value through a dedicated signaling.

In an alternative implementation, when the physical downlink control channel PDCCH for scheduling new data transmission corresponding to traffic with a large amount of data is received on the secondary frequency band, the switching from the secondary frequency band to the primary frequency band is performed, wherein the PDCCH includes at least one of the following:

(1) a PDCCH scrambled using a specific radio network temporary identifier RNTI value, the specific RNTI value corresponds to traffic with a large amount of data;

(2) a PDCCH in a specific PDCCH search space, the specific PDCCH search space corresponds to traffic with a large amount of data;

(3) a PDCCH in a specific control resource set CORESET, the specific CORESET corresponds to traffic with a large amount of data;

(4) a PDCCH using a specific downlink control information DCI format, the specific DCI format corresponds to traffic with a large amount of data;

(5) a PDCCH with a scheduled transport block size TBS value exceeding the preset threshold;

(6) a PDCCH with the number of scheduled frequency domain resource blocks exceeding the preset threshold; or (7) a PDCCH with the carried downlink control information DCI containing an indication domain that explicitly or implicitly indicates that a traffic type is traffic with a large amount of data.

In an alternative implementation, according to the periodic characteristics of UE traffic, the base station can configure a UE to switch between the primary frequency band and the secondary frequency band periodically, that is, without signaling triggering, the UE can switch between the primary frequency band and the secondary frequency band autonomously, according to the preconfigured frequency band switching mode. In each cycle, the UE first stays on the primary frequency band for a period of time, then switches to the secondary frequency band for a period of time, and then periodically repeats the above process.

The advantage of this implementation is to reduce the UE power consumption as much as possible, and at the same time reduce the signaling overhead. On the basis of this implementation, in order to better match the dynamic changes of traffics, the UE can also be dynamically instructed to switch between the primary frequency band and the secondary frequency band through a dedicated signaling. Or, the UE can switch between the primary frequency band and the secondary frequency band autonomously when the predetermined conditions are met.

The following details about the periodically switching between the primary frequency band and the secondary frequency band.

Please refer to FIG. 6, which shows a schematic diagram of a frequency band cycle according to an embodiment of the present disclosure.

As shown in FIG. 6 below, the duration of one frequency band cycle is T, and the duration of the frequency band cycle includes a primary frequency band active time T1 and a secondary frequency band active time T2, where T=T1+T2, and when in the primary frequency band active time, the user equipment transmits data on the primary frequency band, and when in the secondary frequency band active time, the user equipment transmits data on the secondary frequency band.

The base station can configure the duration of a frequency band cycle to be T, in which the primary frequency band active time is T1, and the remaining time is the secondary frequency band active time, i.e. T-T1; or, the base station configures the primary frequency band active time of the UE to be T1 and the secondary frequency band active time to be T2, then the duration of one frequency band cycle is T1+T2. In addition to configuring the values of T1/T2 or T/T1 mentioned above, the base station should also configure the starting time point of a frequency band cycle, that is, the starting time point of entering the primary frequency band.

If the UE is configured with the above-mentioned periodic frequency band working mode, the UE switches from the secondary frequency band to the primary frequency band at a preconfigured time point (that is, the starting point of the primary frequency band in each cycle) and from the primary frequency band to the secondary frequency band at a preconfigured time point (that is, the end point of the primary frequency band in each cycle).

In an alternative implementation, assuming that the primary frequency band and the secondary frequency band are downlink frequency bands, in order to avoid waste of resources, the above-mentioned T1, T2 or T are configured with a granularity of one downlink time slot or an absolute time unit.

In an alternative implementation, T and the starting position of one frequency band cycle are preconfigured by the same parameter through higher-layer signaling, and at least one of T1 and T2 is preconfigured through higher-layer signaling.

In an alternative implementation, multiple frequency bands with larger bandwidth can be configured as primary frequency bands at the same time, but at the same time, UE can only work on one of the primary frequency bands, and the bandwidths of these primary frequency bands can be the same or different, and UE can freely switch on these primary frequency bands during the primary frequency band active time, for example, the UE is triggered by the base station to switch on several primary frequency bands through signaling; similarly, multiple frequency bands with smaller bandwidth can be configured as secondary frequency bands at the same time, but at the same time, the UE can only work on one of the secondary frequency bands, and the bandwidths of these secondary frequency bands can be the same or different, and the UE can freely switch on these secondary frequency bands during the secondary frequency band active time, for example, the UE is triggered by the base station to switch on multiple secondary frequency bands through signaling.

Please refer to FIG. 7, which shows a schematic diagram of switching-related operations when user equipment is configured with multiple primary frequency bands and multiple secondary frequency bands according to an embodiment of the present disclosure.

As shown in FIG. 7 below, during the primary frequency band active time, the UE can switch between two or more primary frequency bands, and during the secondary frequency band active time, the UE can switch between two or more secondary frequency bands.

The following describes in detail about the UE behavior at the switching point when the primary frequency band and the secondary frequency band are periodically switched.

In an alternative implementation, at the above-mentioned semi-statically configured periodic frequency band switching point, no matter whether there are ongoing transmissions or unfinished scheduled transmissions on the current frequency band, the UE needs to switch to the next frequency band autonomously, that is, the UE should abandon ongoing or unfinished transmissions on the current frequency band and unconditionally perform frequency band switching. No matter whether switching from the primary frequency band to the secondary frequency band or from the secondary frequency band to the primary frequency band, UE unconditionally performs switching at the semi-static configured frequency band switching point.

In an alternative implementation, at the above-mentioned semi-statically configured periodic frequency band switching point, if it is switched from the secondary frequency band to the primary frequency band, the UE unconditionally performs the switching. If the switch is from the primary frequency band to the secondary frequency band, the UE needs to determine whether to perform the switch. If there are ongoing or unfinished data transmissions on the primary frequency band, the UE decides whether to perform the switch according to the priorities of these data transmissions. For example, if the priorities of these data transmissions are lower than or equal to the preset priority threshold, the UE performs switching from the primary frequency band to the secondary frequency band; otherwise, the UE does not switch from the primary frequency band to the secondary frequency band, and switches to the secondary frequency band after the data transmissions on the primary frequency band are completed; or, if the priorities of data transmissions are higher than the preset priority threshold, the user equipment skips this frequency band switching. If there is no ongoing or unfinished data transmission on the primary frequency band, the UE performs the switching from the primary frequency band to the secondary frequency band.

In an alternative implementation, at the above-mentioned semi-statically configured periodic frequency band switching point, no matter whether switching from the primary frequency band to the secondary frequency band or from the secondary frequency band to the primary frequency band, the UE needs to determine whether to perform the switching. If there are ongoing or unfinished data transmissions on the current frequency band, the UE decides whether to perform the switching according to the priorities of these data transmissions. For example, if the priorities of these data transmissions are lower than or equal to the preset priority threshold, the UE performs switching; if the priorities of the data transmissions are higher than the preset priority threshold, the UE does not perform switching, and performs switching after completing these data transmissions; or if the priorities of the data transmissions are higher than the preset priority threshold, the user equipment skips this frequency band switching.

The preset priority threshold for determining whether to switch from the secondary frequency band to the primary frequency band may be different from the preset priority threshold for determining whether to switch from the primary frequency band to the secondary frequency band.

The following describes in detail about the related operations of dynamically in-structing UE to switch between the primary frequency band and the secondary frequency band through a dedicated signaling when periodically switching between the primary frequency band and the secondary frequency band.

In an alternative implementation, in the above-mentioned periodic primary/secondary frequency band working mode, the base station can also instruct the UE to switch from the primary frequency band to the secondary frequency band in advance or instruct the UE to switch from the secondary frequency band to the primary frequency band in advance through a dedicated signaling (for example, the second signaling), which is only used for the current frequency band cycle and has no influence on the subsequent frequency band cycles. For example, the base station instructs the UE to perform the switching between the primary frequency band and the secondary frequency band through the media access control control element MAC CE or the downlink control information DCI.

Please refer to FIG. 8, which shows a schematic diagram of respective switching between the primary frequency band and the secondary frequency band based on a dedicated signaling according to an embodiment of the present disclosure.

As shown in FIG. 8, the UE receives one signaling in the primary frequency band active time of one frequency band cycle, which indicates that the UE immediately switches from the primary frequency band to the secondary frequency band. Considering that the response time of the UE to the signaling is T-proc, including the receiving and processing time of the signaling and the preparation time for frequency band switching, the UE should switch from the primary frequency band to the secondary frequency band after T-proc time since receiving the signaling. As can be seen from FIG. 8, in this frequency band cycle where the signaling occurs, the primary frequency band active time is shortened and the secondary frequency band active time is extended, to match the corresponding traffic change.

Alternatively, the UE receives one signaling in the primary frequency band active time of one frequency band cycle, which indicates that the UE switches from the primary frequency band to the secondary frequency band after a first preset time (for example, t1), and the size of the first preset time can be configured by the signaling, or preconfigured by a higher layer signaling, or a predefined value. If the first preset time is small, the primary frequency band active time can be shortened and the secondary frequency band active time can be extended in this frequency band cycle where the signaling occurs; if the first preset time is large, the primary frequency band active time can be extended and the secondary frequency band active time can be shortened in this frequency band cycle where the signaling occurs.

Please refer to FIG. 9, which shows another schematic diagram of respective switching between the primary frequency band and the secondary frequency band based on a dedicated signaling according to an embodiment of the present disclosure.

As shown in FIG. 9, the UE receives one signaling in the secondary frequency band active time of one frequency band cycle, which indicates that the UE immediately switches from the secondary frequency band to the primary frequency band, and considering that the response time of the UE to the signaling is T-proc, including the receiving and processing time of the signaling and the preparation time for frequency band switching, the UE should switch from the secondary frequency band to the primary frequency band after T-proc time since receiving the signaling. As can be seen from FIG. 9, in this frequency band cycle where the signaling occurs, the secondary frequency band active time is shortened, and accordingly, the primary frequency band active time of the next frequency band cycle is extended, to match the corresponding traffic change.

Alternatively, the UE receives one signaling in the secondary frequency band active time of one frequency band cycle, which indicates that the UE switches from the secondary frequency band to the primary frequency band after a second preset time (for example, t2), and the size of the second preset time can be configured by the signaling, or preconfigured by a higher layer signaling, or a predefined value. If the second preset time is small, the secondary frequency band active time can be shortened in this frequency band cycle where the signaling occurs, and the primary frequency band active time of the next frequency band cycle can be extended; if the second preset time is large, the secondary frequency band active time can be extended and the primary frequency band active time of the next frequency cycle period can be shortened.

Please refer to FIG. 10, which shows another schematic diagram of respective switching between the primary frequency band and the secondary frequency band based on a dedicated signaling according to an embodiment of the present disclosure.

As shown in FIG. 10, the UE receives one signaling in the primary frequency band active time of one frequency band cycle, which indicates that the user equipment postpones the next periodically switching point from the primary frequency band to the secondary frequency band by a third preset time (for example, t3), and the size of the third preset time is indicated by the signaling, or preconfigured by higher-level signaling, or a predefined value. As can be seen from FIG. 10, in this frequency band cycle where the signaling occurs, the primary frequency band active time is extended to T1+t3, and accordingly, the secondary frequency band active time of this frequency band cycle is shortened to T-T1−t3, to match the corresponding traffic change.

Please refer to FIG. 11, which shows yet another schematic diagram of corresponding switching between the primary frequency band and the secondary frequency band based on a dedicated signaling according to an embodiment of the present disclosure.

As shown in FIG. 11, the UE receives one signaling in the secondary frequency band active time of one frequency band cycle, which indicates that the user equipment postpones the next periodically switching point from the secondary frequency band to the primary frequency band by a fourth preset time (for example, t4), and the size of the fourth preset time is indicated by the signaling, or preconfigured by a higher layer signaling, or a predefined value. As can be seen from the figure, in this frequency band cycle where the signaling occurs, the secondary frequency band active time is extended to T-T1+t4, and accordingly, the primary frequency band active time of the next frequency band cycle is shortened to T1−t4, to match the corresponding traffic change.

The following describes in detail about the related operations of adjusting at least one of the primary frequency band active time and the secondary frequency band active time of the next frequency band cycle by a dedicated signaling when the primary frequency band and the secondary frequency band are periodically switched.

In an alternative implementation, in the above-mentioned periodic primary/secondary frequency band working mode, the base station can also adjust the duration of at least one of the primary frequency band active time and the secondary frequency band active time of the next cycle through a dedicated signaling (for example, the third signaling). For example, in the current cycle, the base station adjusts the duration of at least one of the primary frequency band active time and the secondary frequency band active time of the next cycle through MAC CE or DCI, and can increase or decrease at least one of the primary frequency band active time and the secondary frequency band active time.

Please refer to FIG. 12, which shows a schematic diagram of adjusting the primary frequency band active time of the next frequency band cycle based on a dedicated signaling according to an embodiment of the present disclosure.

As shown in FIG. 12, the UE receives one signaling in one frequency band cycle, which indicates that the primary frequency band active time of the next frequency band cycle is extended by a fifth preset time (for example, t5), that is, it is extended to T1+t5, wherein the size of the fifth preset time can be configured by the signaling, preconfigured by a higher layer signaling, or a predefined value;

Alternatively, the UE receives one signaling within one frequency band cycle, which indicates that the primary frequency band active time of the next frequency band cycle is shortened by a sixth preset time (for example, t6), that is, shortened to T1−t6, wherein the size of the sixth preset time can be configured by the signaling, preconfigured by a higher layer signaling, or a predefined value.

In an alternative implementation, in the above-mentioned periodic primary/secondary frequency band working mode, the base station can further introduce the primary frequency band for a period of time in the current frequency band cycle through a dedicated signaling (for example, the fourth signaling). For example, the base station instructs the user equipment to switch from the secondary frequency band to the primary frequency band immediately or after the seventh preset time through MAC CE or DCI, and then switches back to the secondary frequency band after stay at the primary frequency band for the eighth preset time.

Please refer to FIG. 13, which shows a schematic diagram of adjusting the primary frequency band active time of the current frequency band cycle based on a dedicated signaling according to an embodiment of the present disclosure.

As shown in FIG. 13, the UE receives one signaling in the secondary frequency band active time of one frequency band cycle, which indicates that the UE immediately switches from the secondary frequency band to the primary frequency band, and then switches back to the secondary frequency band after staying at the primary frequency band for the eighth preset time (for example, t8). Considering that the response time of the UE to the signaling is T-proc, including the receiving and processing time of the signaling and the preparation time of frequency band switching, the UE should switch from the secondary frequency band to the primary frequency band after T-proc time since receiving the signaling.

Alternatively, the UE receives one signaling in the secondary frequency band active time of one frequency band cycle, which indicates that the UE switches from the secondary frequency band to the primary frequency band after the seventh preset time (e.g. t7), and then switches back to the secondary frequency band after staying at the primary frequency band for the eighth preset time (e.g. t8).

Wherein the seventh preset time and the eighth preset time are indicated by the signaling, or preconfigured by a higher layer signaling, or predefined values.

Here, within a frequency band cycle, there can be two active times of primary frequency band. The first active time of primary frequency band is semi-statically preconfigured and appears periodically in each frequency band cycle, and the second active time of primary frequency band is indicated by MAC CE or DCI and is only used for the current frequency band cycle. If the duration of the second active time of primary frequency band configured by the base station (that is, the eighth preset time) is large enough, it will not switch back to the secondary frequency band before entering the next frequency band cycle. Once entering the next frequency band cycle, the preconfigured primary frequency band and secondary frequency band working modes will be used.

The related operations under the discontinuous reception DRX scenario are described in detail below.

In the NR system earlier than Rel-16, the UE starts the timer drx-onDuration Timer at the starting position of the active time of each DRX cycle and starts to monitor the PDCCH. In the Rel-16 NR system, in order to save UE power consumption, there may be a corresponding Wake Up Signal (WUS) before the starting position of the active time of each DRX cycle, which is used to indicate whether the UE wakes up at the corresponding starting position of the active time to monitor to PDCCH, and if WUS indicates that the UE does not need to wake up at the corresponding starting position of the active time, the UE can continue to sleep to save power consumption. In the Rel-16 NR system, WUS is carried by a DCI, that is, a DCI dedicated to power saving function is defined, and the DCI contains an indication field for WUS.

In an alternative implementation, if the WUS corresponding to the OnDuration of one DRX cycle indicates that the UE starts the timer drx-onDuration Timer at the starting position of the active time and starts to monitor the PDCCH, the WUS can further indicate whether the UE monitors the PDCCH on the primary frequency band or on the secondary frequency band.

Please refer to FIG. 14, which shows a schematic diagram of receiving a power-saving DCI in DRX cycle according to an embodiment of the present disclosure.

As shown in FIG. 14 below, there is a corresponding power-saving DCI before the starting position of the active time of each DRX cycle, and the power-saving DCI includes an indication field for indicating at least one of the following:

(1) indicating that the user equipment does not need to start the discontinuous reception on-duration timer drx-onDurationTimer at the starting position of the active time;

(2) indicating that the user equipment starts the discontinuous reception on-duration timer drx-onDurationTimer at the starting position of the active time, and monitoring the physical downlink control channel PDCCH on the primary frequency band; or (3) indicating that the user equipment start the discontinuous reception on-duration timer drx-onDurationTimer at the starting position of the active time, and monitoring the physical downlink control channel PDCCH on the secondary frequency band.

In addition, in the existing NR system, the DRX mechanism includes two UE states, the monitoring PDCCH state and the sleeping state, which correspond to the active time and the non-active time, respectively. The DRX mechanism controls the UE to switch between these two states through various timers to achieve the purpose of maximum power saving.

Actually, according to the power consumption, it can be more finely divided into three UE states: the first one is the low-power state in which the PDCCH monitoring is stopped, that is, there is no need to monitor PDCCH and perform other transmission, and the power consumption of UE in this state is the lowest; the second is the moderate power consumption state of monitoring PDCCH and transmitting/receiving data on the secondary frequency band, that is, it is necessary to monitor PDCCH in a small bandwidth, and other transmission may be performed in a small bandwidth, and the power consumption of UE in this state is moderate; the third is the high power consumption state of monitoring the downlink physical control channel PDCCH and transmitting/receiving data on the primary frequency band, that is, it is necessary to monitor the PDCCH on a large bandwidth, and other transmissions may be performed on a small bandwidth, in which the power consumption of the UE is the largest.

In order to further save the power consumption of the UE, the switching of the UE in these three states can be controlled by a timer, that is, the present disclosure proposes a new DRX mechanism.

A new DRX mechanism with three states is defined, which are: the low power consumption state of stopping PDCCH monitoring; the moderate power consumption state of monitoring PDCCH and transmitting/receiving data on the secondary frequency band, and the high power consumption state of monitoring the downlink physical control channel PDCCH and transmitting/receiving data on the primary frequency band.

The main framework is similar to the existing DRX mechanism. At the starting position of the active time of each DRX cycle, the UE needs to wake up to monitor the PDCCH and start the discontinuous reception on-duration timer DRX-onDurationTimer, and except for the discontinuous reception on-duration timer DRX-onDurationTimer, it also defines discontinuous reception primary frequency band inactivity timer Drx-PrimaryFB-inactivityTimer and discontinuous reception secondary frequency band inactivity timer Drx-SecondaryFB-inactivity Timer for primary frequency band and secondary frequency band respectively.

In an alternative implementation, the user equipment receives discontinuous reception DRX configuration parameters carried by a higher layer signaling, and performs corresponding DRX operation according to the DRX configuration parameters. Wherein the DRX configuration parameters include at least one of the following parameters: duration T3 of one DRX cycle, duration T4 of the high power consumption state of monitoring downlink physical control channel PDCCH and transmitting/receiving data on the primary frequency band, duration T5 of the moderate power consumption state of monitoring PDCCH and transmitting/receiving data on the secondary frequency band, or duration T6 of the low power consumption state of stopping PDCCH monitoring.

In an alternative implementation, the DRX parameter configuration further comprises a discontinuous reception primary frequency band inactivity timer Drx-PrimaryFB-inactivityTimer and/or a discontinuous reception secondary frequency band inactivity timer Drx-SecondaryFB-inactivityTimer, wherein if the discontinuous reception primary frequency band inactivity timer is running, the user equipment monitors PDCCH on the primary frequency band; and if the discontinuous reception secondary frequency band inactivity timer is running and the discontinuous reception primary frequency band inactivity timer is not running, the user equipment monitors the PDCCH on the secondary frequency band.

In an alternative implementation, based on the indication of the fifth signaling, the user equipment starts or restarts the discontinuous reception primary frequency band inactivity timer Drx-PrimaryFB-inactivityTimer or discontinuous reception secondary frequency band inactivity timer Drx-SecondaryFB-inactivityTimer, wherein the fifth signaling is carried by the media access control element MAC CE or downlink control information DCI.

In an alternative implementation, if the UE receives the physical downlink control channel PDCCH for scheduling new data transmission corresponding to traffic with a large amount of data, no matter whether the PDCCH is received on the primary frequency band or on the secondary frequency band, the UE should start or restart the discontinuous reception primary frequency band inactivity timer Drx-PrimaryFB-inactivity Timer at the first symbol after the PDCCH, and the UE needs to transmit the data channel scheduled by the PDCCH on the primary frequency band with large bandwidth, and if the current frequency band is not the primary frequency band, the UE should switch to the primary frequency band.

Wherein the physical downlink control channel PDCCH for scheduling new data transmission corresponding to traffic with a large amount of data may include at least one of the following:

(1) a PDCCH scrambled using a specific radio network temporary identifier RNTI value, the specific RNTI value corresponds to traffic with a large amount of data;

(2) a PDCCH in a specific PDCCH search space, the specific PDCCH search space corresponds to traffic with a large amount of data;

(3) a PDCCH in a specific control resource set CORESET, the specific CORESET corresponds to traffic with a large amount of data;

(4) a PDCCH using a specific downlink control information DCI format, the specific DCI format corresponds to traffic with a large amount of data;

(5) a PDCCH with a scheduled transport block size TBS value exceeding the preset threshold;

(6) a PDCCH with the number of scheduled frequency domain resource blocks exceeding the preset threshold; or (7) a PDCCH with the carried downlink control information DCI containing an indication domain that explicitly or implicitly indicates that a traffic type is traffic with a large amount of data.

In an alternative implementation, if the UE receives a physical downlink control channel PDCCH for scheduling new data transmission corresponding to traffic with a small amount of data, no matter whether the PDCCH is received on the primary frequency band or on the secondary frequency band, the UE starts or restarts the discontinuous reception DRX secondary frequency band inactivity timer Drx-SecondaryFB-inactivityTimer at the first symbol after the PDCCH, and the UE can transmit the data channel scheduled by the PDCCH on the primary frequency band with large bandwidth or the secondary frequency band with small bandwidth, that is, the start of the Drx-SecondaryFB-inactivity Timer will not cause the switching between the primary frequency band and the secondary frequency band.

Wherein the physical downlink control channel PDCCH for scheduling new data transmission corresponding traffic with a small amount of data may include at least one of the following:

(1) a PDCCH scrambled using a specific radio network temporary identifier RNTI value, the specific RNTI value corresponds to traffic with a small amount of data;

(2) a PDCCH in a specific PDCCH search space, the specific PDCCH search space corresponds to traffic with a small amount of data;

(3) a PDCCH in a specific control resource set CORESET, the specific CORESET corresponds to traffic with a small amount of data;

(4) a PDCCH using a specific downlink control information DCI format, the specific DCI format corresponds to traffic with a small amount of data;

(5) a PDCCH with a scheduled transport block size TBS value less than the preset threshold;

(6) a PDCCH with the number of the scheduled frequency domain resource blocks less than the preset threshold; or (7) a PDCCH with the carried downlink control information DCI containing an indication domain that explicitly or implicitly indicates that a traffic type is traffic with a small amount of data.

In an alternative implementation, if the discontinuous reception primary frequency band inactivity timer Drx-PrimaryFB-inactivity Timer is started, and if the current frequency band is a secondary frequency band, the user equipment switches from the current secondary frequency band to the primary frequency band to monitor the physical downlink control channel PDCCH.

In an alternative implementation, if the discontinuous reception primary frequency band inactivity timer Drx-PrimaryFB-inactivityTimer expires, and if the discontinuous reception on-duration timer drx-onDurationTimer is running, the user equipment switches from the primary frequency band to the secondary frequency band to monitor the physical downlink control channel PDCCH.

In an alternative implementation, if the discontinuous reception primary frequency band inactivity timer Drx-PrimaryFB-inactivityTimer expires, and at least one of discontinuous reception on-duration timer drx-onDurationTimer and discontinuous reception secondary frequency band inactivity timer Drx-SecondaryFB-inactivityTimer is running, the user equipment switches from the primary frequency band to the secondary frequency band to monitor the physical downlink control channel PDCCH.

In an alternative implementation, if the discontinuous reception primary frequency band inactivity timer Drx-PrimaryFB-inactivityTimer, discontinuous reception on-duration timer drx-onDurationTimer and discontinuous reception secondary frequency band inactivity timer Drx-SecondaryFB-inactivityTimer all expire, the user equipment enters the sleeping state and stops monitoring the physical downlink control channel PDCCH.

Similar to the timers drx-HARQ-RTT-TimerDL, drx-HARQ-RTT-TimerUL, drx-retransmission TimerDL and drx-retransmissionTimerUL of the existing DRX system, similar timers can be defined for the primary frequency band and the secondary frequency band respectively to monitor the PDCCH indicating retransmission, for example, define drx-PrimaryFB-HARQ-RTT-TimerDL, drx-PrimaryFB-HARQ-RTT-TimerUL, drx-Primary FB-Retransmission-TimerDL, drx-Primary FB-RetransmissionTimerUL for the primary frequency band; DRX-SecondaryFB-HARQ-RTT-TimerDL, DRX-SecondaryFB-HARQ-RTT-TimerUL, drx-Secondary FB-RetransmissionTimerDL, drx-SecondaryFB-Retransmission TimerUL are defined for the secondary frequency band, and the specific use method is similar to the existing timers.

In an alternative implementation, the UE first monitors the PDCCH on the secondary frequency band after waking up at the starting position of the active time of each DRX cycle, which has the advantage of saving power as much as possible. During the secondary frequency band active time, the base station can instruct the UE to switch from the secondary frequency band to the primary frequency band and start the Drx-PrimaryFB-inactivity Timer through a dedicated signaling, or, if certain conditions are met, for example, if the UE receives a PDCCH indicating new transmission corresponding to traffic with a large amount of data, the UE can autonomously switch from the secondary frequency band to the primary frequency band and start the Drx-PrimaryFB-inactivityTimer.

Please refer to FIG. 15, which shows a schematic diagram of frequency band switching in a DRX scenario according to an embodiment of the present disclosure.

As shown in FIG. 15 below, the UE enters the secondary frequency band to monitor the PDCCH at the starting position of the active time. If the UE receives the physical downlink control channel PDCCH for scheduling new data transmission corresponding to traffic with a large amount of data, the UE switches from the secondary frequency band to the primary frequency band and starts the Drx-PrimaryFB-inactivity Timer. If the Drx-PrimaryFB-inactivityTimer expires and the drx-onDurationTimer is still running, the UE switches from the primary frequency band to the primary frequency band.

FIG. 16 is a block diagram showing the structure of a user equipment 500 according to an embodiment of the present disclosure.

Referring to FIG. 16, the user equipment 500 includes a transceiver 510 and a processor 520. The transceiver 510 is configured to send and receive signals to and from the outside. The processor 520 is configured to perform any of the above methods performed by the user equipment. The user equipment 500 can be implemented in the form of hardware, software or a combination of hardware and software to enable it to perform the above-mentioned method of frequency band switching performed by the user equipment described in this disclosure.

At least one embodiment of the present disclosure also provides a non-transitory computer-readable recording medium on which a program for executing the above-mentioned method when being run by a computer has been stored.

The method of frequency band switching performed by a user equipment provided according to the present disclosure, includes: acquiring a configuration of one or more first frequency bands and one or more second frequency bands; performing switching between the first frequency band and the second frequency band.

The method of frequency band switching performed by a user equipment provided according to the present disclosure, wherein the first frequency band and the second frequency band have at least one of the following relationships: the ratio of the bandwidth of the first frequency band to the bandwidth of the second frequency band is greater than a first preset threshold; the frequency bands of the first frequency band and the second frequency band are not overlapped; the first frequency band and the second frequency band belong to the same bandwidth part BWP; the first frequency band and the second frequency band are two different bandwidth parts BWP; the first frequency band and the second frequency band have the same central frequency point; the first frequency band and the second frequency band share the same downlink physical control channel configuration; or the first frequency band and the second frequency band include both the uplink frequency band and the downlink frequency band or include only the downlink frequency band.

The method of frequency band switching performed by a user equipment provided according to the present disclosure, wherein performing switching between the first frequency band and the second frequency band includes at least one of the following: switching from the first frequency band to the second frequency band and/or switching from the second frequency band to the first frequency band based on the received first signaling; or when the first timer expires, performing switching from the first frequency band to the second frequency band; or when the physical downlink control channel PDCCH for scheduling new data transmission corresponding to traffic with a large amount of data is received on the second frequency band, performing switching from the second frequency band to the first frequency band; or periodically switching between the first frequency band and the second frequency band.

The method of frequency band switching performed by a user equipment provided according to the present disclosure, wherein the first timer is started or restarted when at least one of the following conditions is met: receiving, on the first frequency band, a physical downlink control channel PDCCH for scheduling new data transmission; receiving, on the first frequency band, a PDCCH for scheduling new data transmission and scrambled using a specific radio network temporary identifier RNTI value, the specific RNTI value corresponds to traffic with a large amount of data; receiving, on the first frequency band, a PDCCH for scheduling new data transmission and in a specific PDCCH search space, the specific PDCCH search space corresponds to traffic with a large amount of data; receiving, on the first frequency band, a PDCCH for scheduling new data transmission and in a specific control resource set CORESET, and the specific CORESET corresponds to traffic with a large amount of data; receiving, on the first frequency band, a PDCCH for scheduling new data transmission and using a specific downlink control information DCI format, the specific DCI format corresponds to traffic with a large amount of data; receiving, on the first frequency band, a PDCCH for scheduling new data transmission and with a scheduled transport block size TBS value exceeding a preset threshold; receiving, on the first frequency band, a PDCCH for scheduling new data transmission and with the number of the allocated frequency domain resource blocks exceeding a preset threshold; or receiving, on the first frequency band, a PDCCH for scheduling new data transmission and with the carried downlink control information DCI containing relevant information indicating that a traffic type is traffic with a large amount of data.

The method of frequency band switching performed by a user equipment provided according to the present disclosure, wherein the physical downlink control channel PDCCH for scheduling new data transmission corresponding to traffic with a large amount of data includes at least one of the following: a PDCCH scrambled using a specific radio network temporary identifier RNTI value, the specific RNTI value corresponds to traffic with a large amount of data; a PDCCH in a specific PDCCH search space, the specific PDCCH search space corresponds to traffic with a large amount of data; a PDCCH in a specific control resource set CORESET, the specific CORESET corresponds to traffic with a large amount of data; a PDCCH using a specific downlink control information DCI format, and the specific DCI format corresponds to traffic with a large amount of data; a PDCCH with a scheduled transport block size TBS value exceeding a preset threshold; a PDCCH with the number of the scheduled frequency domain resource blocks exceeding a preset threshold; or a PDCCH with the carried downlink control information DCI containing relevant information indicating that a traffic type is traffic with a large amount of data.

The method of frequency band switching performed by a user equipment provided according to the present disclosure, wherein if the user equipment is configured with a plurality of first frequency bands and/or a plurality of second frequency bands, performing switching of the first frequency bands and the second frequency bands includes: switching among the plurality of first frequency bands by the user equipment during the first frequency band active time; and/or switching among the plurality of second frequency bands by the user equipment during the second frequency band active time.

The method of frequency band switching performed by a user equipment provided according to the present disclosure, wherein the duration of one frequency band cycle is T, and the duration of the one frequency band cycle includes a primary frequency band active time T1 and a secondary frequency band active time T2, where T=T1+T2, when in the primary frequency band active time, the user equipment transmits data on the primary frequency band, and when in the secondary frequency band active time, the user equipment transmits data on the secondary frequency band.

The method of frequency band switching performed by a user equipment provided according to the present disclosure, wherein the granularity of T, T1 and T2 is one downlink time slot or one absolute time unit.

The method of frequency band switching performed by a user equipment provided according to the present disclosure, wherein the T and the starting position of a frequency band cycle are preconfigured by the same parameter through a higher layer signaling, and at least one of T1 and T2 is preconfigured through a higher layer signaling.

The method of frequency band switching performed by a user equipment provided according to the present disclosure, wherein the periodically switching between the first frequency band and the second frequency band includes at least one of the following operations: no matter whether the current frequency band is the first frequency band or the second frequency band, when the corresponding active time ends, even if there is still unfinished data transmission on the current frequency band, immediately switching to another frequency band; or if the current frequency band is the second frequency band, when the corresponding second frequency band active time ends, even if there is still unfinished data transmission on the current frequency band, immediately switching to the first frequency band; or if the current frequency band is the first frequency band, when the corresponding first frequency band active time ends, if there is still unfinished data transmission on the first frequency band, determining whether to perform switching based on the priority of data transmission; or no matter whether the current frequency band is the first frequency band or the second frequency band, when the corresponding active time ends, if there is still unfinished data transmission on the current frequency band, determining whether to perform switching based on the priority of data transmission.

The method of frequency band switching performed by a user equipment provided according to the present disclosure, wherein determining whether to perform switching based on the priority of data transmission includes: if the priority of data transmission is lower than or equal to a preset priority threshold, performing the frequency band switching; if the priority of data transmission is higher than the preset priority threshold, the user equipment performs the frequency band switching after finishing data transmission; or if the priority of data transmission is higher than the preset priority threshold, the user equipment skips this frequency band switching.

The method of frequency band switching performed by a user equipment provided according to the present disclosure, the periodically switching between the first frequency band and the second frequency band further comprises: performing the corresponding switching between the first frequency band and the second frequency band based on the second signaling received in the first frequency band active time or the second frequency band active time of the one frequency band cycle, or adjusting at least one of the first frequency band active time and the second frequency band active time of the next frequency band cycle based on the third signaling received in the previous frequency band cycle, or further introducing the first frequency band active time for a period of time in the current frequency band cycle based on the fourth signaling received in the second frequency band active time of the current frequency band cycle.

The method of frequency band switching performed by a user equipment provided according to the present disclosure, wherein the second instruction is used to indicate at least one of the following: indicating the user equipment to switch from the first frequency band to the second frequency band immediately or after a first preset time;

indicating the user equipment to switch from the second frequency band to the first frequency band immediately or after a second preset time; indicating the user equipment to postpone the next periodically switching point from the first frequency band to the second frequency band for a third preset time; indicating the user equipment to postpone the next periodically switching point from the second frequency band to the first frequency band for the fourth preset time.

The method of frequency band switching performed by a user equipment provided according to the present disclosure, wherein the third signaling is used to indicate at least one of the following: indicating that at least one of the first frequency band active time and the second frequency band active time of the next frequency band cycle is extended by a fifth preset time, and indicating that at least one of the first frequency band active time and the second frequency band active time of the next frequency band cycle is shortened by a sixth preset time.

The method of frequency band switching performed by a user equipment provided according to the present disclosure, wherein the fourth signaling is used to indicate the user equipment to switch from the second frequency band to the first frequency band immediately or after a seventh preset time, and then switch back to the second frequency band after staying at the first frequency band for an eighth preset time.

The method of frequency band switching performed by a user equipment provided according to the present disclosure, further comprises receiving downlink control information DCI before the starting position of the active time of each discontinuous reception DRX cycle, and determining an operation of the user equipment at the corresponding starting position of the active time based on the DCI, wherein the starting position of the active time is the position at which the user equipment periodically starts, and the downlink control information DCI includes an indication field for indicating at least one of the following: indicating that the user equipment does not need to start a discontinuous reception on-duration timer at the starting position of the active time; indicating the user equipment to start the discontinuous reception on-duration timer at the starting position of the active time, and monitor the physical downlink control channel PDCCH on the first frequency band; indicating the user equipment to start the discontinuous reception on-duration timer at the starting position of the active time, and monitor the physical downlink control channel PDCCH on the second frequency band.

The method of frequency band switching performed by a user equipment provided according to the present disclosure, further comprises receiving discontinuous reception DRX configuration parameters carried by a higher layer signaling, and performing corresponding DRX operations according to the DRX configuration parameters, wherein the DRX configuration parameters include at least one of the following parameters: a duration T3 of one DRX cycle, a duration T4 of the high power consumption state of monitoring the downlink physical control channel PDCCH and transmitting data on the first frequency band, a duration T5 of the moderate power consumption state of monitoring the PDCCH and transmitting data on the second frequency band, or a duration T6 of the low power consumption state of stopping PDCCH monitoring.

The method of frequency band switching performed by a user equipment provided according to the present disclosure, wherein the DRX parameter configuration further comprises a discontinuous reception first frequency band inactivity timer and/or a discontinuous reception second frequency band inactivity timer, wherein if the discontinuous reception first frequency band inactivity timer is running, the user equipment monitors the PDCCH on the first frequency band; if the discontinuous reception second frequency band inactivity timer is running, and the discontinuous reception first frequency band inactivity timer is not running, the user equipment monitors the PDCCH on the second frequency band.

The method of frequency band switching performed by a user equipment provided according to the present disclosure, further comprises at least one of the following: based on the indication of the fifth signaling, the user equipment starts or restarts the discontinuous reception first frequency band inactivity timer or the discontinuous reception second frequency band inactivity timer; or when receiving the physical downlink control channel PDCCH for scheduling new data transmission corresponding to traffic with a large amount of data, the user equipment starts or restarts the discontinuous reception first frequency band inactivity timer at the first symbol after the PDCCH, or when receiving the physical downlink control channel PDCCH for scheduling new data transmission corresponding to traffic with a small amount of data, the user equipment starts or restarts the discontinuous reception DRX second frequency band inactivity timer at the first symbol after the PDCCH.

The method of frequency band switching performed by a user equipment provided according to the present disclosure, wherein the physical downlink control channel PDCCH for scheduling new data transmission corresponding to traffic with a large amount of data includes at least one of the following: a PDCCH scrambled using a specific radio network temporary identifier RNTI value, the specific RNTI value corresponds to traffic with a large amount of data; a PDCCH in a specific PDCCH search space, the specific PDCCH search space corresponds to traffic with a large amount of data; a PDCCH in a specific control resource set CORESET, the specific CORESET corresponds to traffic with a large amount of data; a PDCCH using a specific downlink control information DCI format, the specific DCI format corresponds to traffic with a large amount of data; a PDCCH with a scheduled transport block size TBS value exceeding a preset threshold; a PDCCH with the number of the scheduled frequency domain resource blocks exceeding a preset threshold; or a PDCCH with the carried downlink control information DCI containing an indication field that explicitly or implicitly indicates that a traffic type is traffic with a large amount of data.

The method of frequency band switching performed by a user equipment provided according to the present disclosure, wherein the physical downlink control channel PDCCH for scheduling new data transmission corresponding to traffic with a small amount of data includes at least one of the following: a PDCCH scrambled using a specific radio network temporary identifier RNTI value, the specific RNTI value corresponds to traffic with a small amount of data; a PDCCH in a specific PDCCH search space, the specific PDCCH search space corresponds to traffic with a small amount of data; a PDCCH in a specific control resource set CORESET, the specific CORESET corresponds to traffic with a small amount of data; a PDCCH using a specific downlink control information DCI format, and the specific DCI format corresponds to traffic with a small amount of data; a PDCCH with a scheduled transport block size TBS value less than a preset threshold; a PDCCH with the number of the scheduled frequency domain resource blocks less than a preset threshold; or a PDCCH with the carried downlink control information DCI containing an indication field that explicitly or implicitly indicates that a traffic type is traffic with a small amount of data.

The method of frequency band switching performed by user equipment provided according to the present disclosure, further includes at least one of the following: if the discontinuous reception first frequency band inactivity timer is started, and if the current frequency band is the second frequency band, the user equipment switches from the current second frequency band to the first frequency band to monitor the physical downlink control channel PDCCH; if the discontinuous reception first frequency band inactivity timer expires and if the discontinuous reception on-duration timer is running, the user equipment switches from the first frequency band to the second frequency band to monitor the physical downlink control channel PDCCH; if the discontinuous reception first frequency band inactivity timer expires and at least one of the discontinuous reception on-duration timer and the discontinuous reception second frequency band inactivity timer is running, the user equipment switches from the first frequency band to the second frequency band to monitor the physical downlink control channel PDCCH; or if the discontinuous reception first frequency band inactivity timer, the discontinuous reception on-duration timer and the discontinuous reception second frequency band inactivity timer all expire, the user equipment enters a sleeping state and stops monitoring the physical downlink control channel PDCCH.

The method of frequency band switching performed by user equipment provided according to the present disclosure, wherein the first signaling, the second signaling, the third signaling, the fourth signaling and the fifth signaling are carried by the media access control control element MAC CE or the downlink control information DCI.

The method of frequency band switching performed by user equipment provided according to the present disclosure, wherein the first preset time, the second preset time, the third preset time and the fourth preset time are indicated by the second signaling, or preconfigured by a higher layer signaling, or are predefined values.

The method of frequency band switching performed by user equipment provided according to the present disclosure, wherein the fifth preset time and the sixth preset time are indicated by the third signaling, or preconfigured by a higher layer signaling, or are predefined values.

The method of frequency band switching performed by user equipment provided according to the present disclosure, wherein the seventh preset time and the eighth preset time are indicated by the fourth signaling, or preconfigured by a higher layer signaling, or are predefined values.

The method of frequency band switching performed by user equipment provided according to the present disclosure, wherein the first timer is a frequency band fallback timer, and is preconfigured by a high-level signaling.

According to one aspect of the present disclosure, there is provided a user equipment, including a transceiver configured to transmit and receive signals with the outside; and a processor configured to control the transceiver to perform any one of the methods performed by the above user equipment.

The above embodiments are merely preferred embodiments of the disclosure, and are not intended to limit the disclosure, any modification, equivalent replacement, or improvement made within the spirit and principles of the disclosure shall be included within the protection scope of the disclosure.

Those skilled in the art may understand that the disclosure includes devices involved to perform one or more of the operations described in this disclosure. These devices may be specially designed and manufactured for the required purpose, or may include known devices in general-purpose computers. These devices have computer programs stored therein that are selectively activated or reconstructed. Such computer programs may be stored in readable medium of a device (e.g., a computer) or stored in any type of medium suitable for storing electronic instructions and are respectively coupled to a bus, the said readable medium of a computer includes but not limited to any types of disks (including floppy disks, hard disks, compact disk, CD-ROMs, and magneto-optical disks), ROM (Read-Only Memory), RAM (Random Access Memory), EPROM (Erasable Programmable Read-Only Memory), EEPROM (Electrically Erasable Programmable Read-Only Memory), flash memory, magnetic card or optical card. That is, a readable medium includes any medium that stores or transmits information in a form by readable a device (e.g., a computer).

Those skilled in the art may understand that computer program instructions may be used to implement each block in these structural diagrams and/or block diagrams and/or flow diagrams and a combination of these structural diagrams and/or block diagrams and/or flow diagrams. Those skilled in the art may understand that these computer program instructions may be provided to a processor of a general purpose computer, a special purpose computer, or other programmable data processing methods to implement, so that the processor of computers or the other programmable data processing methods may execute the scheme specified by a block or multiple blocks of the disclosed structural diagrams and/or block diagrams and/or flow diagrams of the disclosure.

Those skilled in the art may understand that various operations, methods, and steps, measures, and solutions in the processes that have been discussed in the disclosure may be alternated, modified, combined, or removed. Further, other steps, measures, and solutions that include the operations, methods, and processes that have been discussed in this disclosure can also be alternated, modified, rearranged, decomposed, combined, or removed. Further, that various operations, methods, and steps, measures, and solutions in the processes disclosed in this disclosure in the existing art may also be alternated, modified, rearranged, decomposed, combined, or removed.

The above description is only part of the embodiments of the disclosure, it should be noted that for those of ordinary skill in the art, without departing from the principles of the disclosure, improvements and modifications may be made, and these improvements and modification also should be regarded as the protection scope of the disclosure.

The invention claimed is:

1. A method performed by a user equipment (UE) for switching a frequency band, the method comprising:

receiving, from a base station, configuration information on one or more first frequency bands and one or more second frequency bands;

determining whether a ratio of a bandwidth of a first frequency band among the one or more first frequency bands to a bandwidth of a second frequency band among the one or more second frequency bands is greater than a first preset threshold;

determining whether at least one of a transport block size (TBS) or a number of resource blocks (RBs) is greater than a second preset threshold; and performing a switching operation between the first frequency band and the second frequency band based on the determinations.

2. The method of claim 1, further comprising:

identifying, based on the first frequency band and the second frequency band, at least one of:

the first frequency band and the second frequency band are not overlapped;

the first frequency band and the second frequency band belong to a same bandwidth part (BWP);

the first frequency band and the second frequency band are two different bandwidth parts (BWPs);

the first frequency band and the second frequency band include a same central frequency point;

the first frequency band and the second frequency band share a same physical downlink control channel (PDCCH) configuration; or the first frequency band and the second frequency band include both an uplink frequency band and a downlink frequency band or include a downlink frequency band.

3. The method of claim 1, wherein the switching operation between the first frequency band and the second frequency band includes at least one of:

based on a received first signaling, at least one of a switching operation from the first frequency band to the second frequency band or a switching operation from the second frequency band to the first frequency band; or when a first timer expires, performing the switching operation from the first frequency band to the second frequency band; or when a PDCCH for scheduling a new data transmission corresponding to traffic with a large amount of data is received on the second frequency band, performing the switching operation from the second frequency band to the first frequency band; or performing a periodic switching operation between the first frequency band and the second frequency band.

4. The method of claim 3, wherein the first timer starts or restarts when at least one of conditions is met:

receiving, on the first frequency band, the PDCCH for scheduling the new data transmission;

receiving, on the first frequency band, the PDCCH for scheduling the new data transmission and scrambling using a radio network temporary identifier (RNTI) value, the RNTI value corresponding to the traffic with the large amount of data;

receiving, on the first frequency band, the PDCCH for scheduling new data transmission and a PDCCH search space corresponding to the traffic with the large amount of data;

receiving, on the first frequency band, the PDCCH for scheduling the new data transmission and a control resource set (CORESET) corresponding to the traffic with the large amount of data;

receiving, on the first frequency band, the PDCCH for scheduling the new data transmission and downlink control information (DCI) corresponding to the traffic with the large amount of data;

receiving, on the first frequency band, the PDCCH for scheduling the new data transmission and the TBS exceeding the second preset threshold;

receiving, on the first frequency band, the PDCCH for scheduling the new data transmission and the number of the RBs exceeding the second preset threshold; or receiving, on the first frequency band, the PDCCH for scheduling the new data transmission and the DCI containing information indicating that a traffic type is the traffic with the large amount of data.

5. The method of claim 3, wherein the PDCCH for scheduling the new data transmission corresponding to the traffic with the large amount of data includes at least one of:

a PDCCH scrambled using RNTI value corresponding to the traffic with the large amount of data;

a PDCCH in a PDCCH search space corresponding to the traffic with the large amount of data;

a PDCCH in a CORESET corresponding to the traffic with the large amount of data;

a PDCCH using DCI corresponding corresponds to traffic with the large amount of data;

a PDCCH with the TBS exceeding the second preset threshold;

a PDCCH with the number of the RBs exceeding the second preset threshold; or a PDCCH with the DCI containing information indicating that a traffic type is the traffic with the large amount of data.

6. The method of according to claim 3, wherein, if the UE is configured with at least one of a plurality of first frequency bands or a plurality of second frequency bands, performing a switching operation for the first frequency bands and the second frequency bands includes at least one of:

a switching operation among the plurality of first frequency bands by the UE during a first frequency band active time; or a switching operation among the plurality of second frequency bands by the UE during a second frequency band active time.

7. The method of claim 3, wherein the periodic switching operation between the first frequency band and the second frequency band includes at least one of operations:

no matter whether a current frequency band is the first frequency band or the second frequency band, when a corresponding active time ends, even if there is still unfinished data transmission on the current frequency band, performing a switching operation to another frequency band; or if the current frequency band is the second frequency band, when a corresponding second frequency band active time ends, even if there is still unfinished data transmission on the current frequency band, performing a switching operation to the first frequency band, or if the current frequency band is the first frequency band, when the first frequency band active time ends, if there is still unfinished data transmission on the first frequency band, determining whether to perform a switching operation based on a priority of data transmission; or no matter whether the current frequency band is the first frequency band or the second frequency band, when the corresponding active time ends, if there is still unfinished data transmission on the current frequency band, determining whether to perform the switching operation based on the priority of data transmission.

8. The method of claim 7, wherein determining whether to perform the switching operation based on the priority of data transmission includes:

if the priority of data transmission is lower than or equal to a preset priority threshold, performing the switching operation to the frequency band;

if the priority of data transmission is higher than the preset priority threshold, performing the switching operation to the frequency band after finishing the data transmission; or if the priority of data transmission is higher than the preset priority threshold, skipping the switching operation to the frequency band.

9. The method of claim 3, the periodic switching operation between the first frequency band and the second frequency band further comprises:

performing the switching operation between the first frequency band and the second frequency band based on a second signaling received in a first frequency band active time or a second frequency band active time of a frequency band cycle, or adjusting at least one of the first frequency band active time and the second frequency band active time of a next frequency band cycle based on a third signal received in a previous frequency band cycle, or identifying the first frequency band active time for a period of time in a current frequency band cycle based on a fourth signal received in the second frequency band active time of the current frequency band cycle.

10. The method of claim 9, further comprising at least one of:

indicating the UE to perform a switching operation from the first frequency band to the second frequency band immediately or after a first preset time;

indicating the UE to perform a switching operation from the second frequency band to the first frequency band immediately or after a second preset time;

indicating the UE to postpone a next periodic switching point from the first frequency band to the second frequency band for a third preset time; or indicating the UE to postpone the next periodic switching point from the second frequency band to the first frequency band for a fourth preset time.

11. The method of claim 9, wherein the third signal is used to indicate at least one of:

indicating that at least one of the first frequency band active time or the second frequency band active time of the next frequency band cycle is extended by a fifth preset time, or indicating that at least one of the first frequency band active time or the second frequency band active time of the next frequency band cycle is shortened by a sixth preset time.

12. The method of claim 9, wherein the fourth signal is used to indicate the UE to perform a switching operation from the second frequency band to the first frequency band immediately or after a seventh preset time, and a switching operation back to the second frequency band after staying at the first frequency band for an eighth preset time.

13. The method of claim 1, further comprising:

receiving DCI before a starting position of an active time of each discontinuous reception (DRX) cycle, and determining an operation of the UE at the starting position of the active time based on the DCI, wherein the starting position of the active time is a time instance at which the UE periodically starts, and the DCI includes an indication field for indicating at least one of:

indicating that the UE holds to start a DRX on-duration timer at the starting position of the active time;

indicating the UE to start the DRX on-duration timer at the starting position of the active time, and monitor a PDCCH on the first frequency band; and indicating the UE to start the DRX on-duration timer at the starting position of the active time, and monitor the PDCCH on the second frequency band.

14. The method of to claim 1, further comprising:

receiving discontinuous reception (DRX) configuration parameters via a higher layer signaling, and performing DRX operations based on DRX configuration parameters, wherein the DRX configuration parameters include at least one of:

a duration T3 of one DRX cycle, a duration T4 of a high power consumption state of monitoring a PDCCH and transmitting data on the first frequency band, a duration T5 of a moderate power consumption state of monitoring the PDCCH and transmitting data on the second frequency band, or a duration T6 of a low power consumption state of stopping PDCCH monitoring.

15. A user equipment (UE) for switching a frequency band comprising:

at least one transceiver;

at least one processor communicatively coupled to the at least one transceiver; and at least one memory, communicatively coupled to the at least one processor, storing instructions executable by the at least one processor individually or in any combination to cause the UE to:

receive, from a base station, configuration information on one or more first frequency bands and one or more second frequency bands, determine whether a ratio of a bandwidth of a first frequency band among the one or more first frequency bands to a bandwidth of a second frequency band among the one or more second frequency bands is greater than a first preset threshold, determine whether at least one of a transport block size (TBS) or a number of resource blocks (RBs) is greater than a second preset threshold, and perform a switching operation between the first frequency band and the second frequency band based on the determinations.

* * * * *